US010110479B1

(12) United States Patent
Ramachandran et al.

(10) Patent No.: US 10,110,479 B1
(45) Date of Patent: Oct. 23, 2018

(54) COMPUTING PATHS WITH ORDERED ABSTRACT HOPS

(71) Applicant: Juniper Networks, Inc., Sunnyvale, CA (US)

(72) Inventors: Chandrasekar Ramachandran, Bangalore (IN); Raveendra Torvi, Nashua, NH (US); Vishnu Pavan Beeram, Ashburn, VA (US); Sudharsana Venkataraman, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 368 days.

(21) Appl. No.: 14/868,703

(22) Filed: Sep. 29, 2015

(51) Int. Cl.
*H04L 12/723* (2013.01)
*H04L 12/24* (2006.01)
*H04L 12/733* (2013.01)
*H04L 12/775* (2013.01)

(52) U.S. Cl.
CPC .......... *H04L 45/50* (2013.01); *H04L 41/0893* (2013.01); *H04L 45/20* (2013.01); *H04L 45/58* (2013.01)

(58) Field of Classification Search
CPC ......... H04L 45/50; H04L 45/58; H04L 45/20; H04L 41/0893
See application file for complete search history.

(56) References Cited

U.S. PATENT DOCUMENTS 7,184,437 B1 2/2007 Cole et al.
8,339,959 B1 12/2012 Moisand et al.
8,885,463 B1 11/2014 Medved et al.
2012/0224506 A1* 9/2012 Gredler .................. H04L 45/04 370/254
2013/0007266 A1* 1/2013 Jocha ...................... H04L 45/00 709/224

FOREIGN PATENT DOCUMENTS

WO 2013184846 A1 12/2013

OTHER PUBLICATIONS

Awduche et al. "RSVP-TE: Extensions to RSVP for LSP Tunnels" Network Working Group, RFC 3209, Dec. 2001, 61 pgs.
U.S. Appl. No. 14/042,614, filed Sep. 30, 2013 entitled Software Defined Network Controller.
U.S. Appl. No. 14/788,602, filed Jun. 30, 2015 entitled Network Topology Optimization With Feasible Optical Paths.

* cited by examiner

*Primary Examiner* — Kent Krueger
(74) *Attorney, Agent, or Firm* — Shumaker & Sieffert, P.A.

(57) ABSTRACT

A network device receives configuration information defining one or more abstract hops for which membership is defined as those network devices that satisfy a logical combination of one or more constituent attributes. The network device determines based on network topology information, for each of the defined abstract hops, a set of network devices that qualify for membership in the abstract hop. The network device receives a request to establish a label switched path (LSP) from an ingress network device to an egress network device, wherein the request specifies, as a constraint for the LSP, a plurality of hops in a defined order, including the one or more abstract hops. The network device selects a path from the ingress network device to the specified egress network device based on the ordered abstract hop constraint, and establishes the LSP along the selected path according to the defined order of the request.

34 Claims, 5 Drawing Sheets

COMPUTING PATHS WITH ORDERED ABSTRACT HOPS

TECHNICAL FIELD

The disclosure relates to computer networks and, more specifically, configuring computer networks.

BACKGROUND

Typically, a device responsible for routing data through a computer network, such as a router, implements one or more intra-network routing protocols commonly referred to as interior gateway protocols (IGPs) to exchange routing information describing links or paths within the network domain. Example IGPs include an Intermediate System to Intermediate System (IS-IS) routing protocol and an Open Shortest Path First (OSPF) routing protocol. The router may then resolve the routing information by selecting a path through the network for reaching each available destination within the network and generating forwarding information, which may be used to forward data packets through the computer network.

Both the IS-IS and OSPF routing protocols fall within a class of routing protocols referred to as link-state protocols. Link state protocols advertise or otherwise facilitate the exchange of routing information by generating and transmitting link state advertisements describing a state of a link between any two adjacent routers within the computer network. These link state advertisements may include information identifying an interface cost or metric associated with an interface to which the link connects and a link cost or metric associated with the link, as well as an administrative group, extended administrative group, or Shared Risk Link Group (SRLG) associated with the link and any other constraints to be employed for selecting a path through a network in accordance with a link state protocol. The administrative group or SRLG associated with the link (sometimes referred to as a "color" or resource class for the link) may provide a way by which an administrator can control path selection by setting a path-wide constraint.

Multi-protocol Label Switching (MPLS) is a mechanism used to engineer traffic patterns within Internet Protocol (IP) networks. By using MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS). A packet may be a formatted set of data.

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information to compute paths and establish LSPs along the paths within a network. For path selection, RSVP-TE may use bandwidth availability information and other metrics accumulated by a link-state interior routing protocol, such OSPF or IS-IS. Details of RSVP-TE are described in D. Awduche, "RSVP-TE: Extensions to RSVP for LSP Tunnels," Network Working Group Request for Comments 3209, December 2001, the entire contents of which are incorporated by reference herein.

In general, a next hop (or more simply, "hop") refers to a next network device to which packets should be forwarded along the path to their final destination. RSVP-TE provides the ability to specify strict or loose hops as constraints for LSP setup. This enables the setup of an LSP along a specified sequence of routers. However, when any of the hops specified as constraint goes down or has its link capacity saturated, an LSP with that constraint will no longer work. But when a router specified as a constraint for the LSP setup becomes unusable due to load or goes down, the LSP stays down until the operator configures another hop having the required criteria.

SUMMARY

In general, techniques are described for providing the ability to configure a network device with user-defined abstract hops that can be used as path constraints for setting up Label Switched Paths (LSPs). An abstract hop is a logical container that includes a set of one or more routers that satisfy a logical combination of one or more link and/or node attributes. The link/node attributes whose combination makes up the abstract hop will be referred to herein as "constituent attributes." The techniques of this disclosure allow a group of routers meeting a logical combination of constituent attributes to be viewed as an abstract hop, and enable ordering among abstract hops when specifying a path constraint. Abstract hops can be defined in terms of logical combinations (which may be exclusions) of different types of link or node attributes. The types of link or node attributes that are used to define abstract hops may be attributes that are typically exchanged via interior gateway protocols (IGP) Traffic Engineering (TE) updates, for example. In some examples, abstract hops may be defined in terms of, for example, administrative groups, extended administrative groups (EAGs), shared risk link groups (SRLG), or other groupings.

According to the techniques of this disclosure, in one example a network device receives configuration information defining one or more abstract hops for which membership is defined as those network devices that satisfy a logical combination of one or more constituent attributes. The network device determines, for each of the defined abstract hops, a set of network devices that qualify for membership in the abstract hop based on network topology information. The network device receives a request to establish a label switched path (LSP) from an ingress network device to an egress network device, wherein the request specifies, as a constraint for the LSP, a plurality of hops in a defined order, including one or more of the abstract hops. The network device selects a path from the ingress network device to the specified egress network device based on the ordered abstract hop constraint, and establishes the LSP along the selected path according to the defined order of the request.

The techniques of this disclosure may provide one or more advantages. For example, the techniques of this disclosure allow administrators to combine the ordering property that comes with hop constraint specification and the fuzziness or abstractness that comes with other attribute constraints, such as color or SRLG specification. The ability to specify and order the abstract hops as hop constraints for LSP setups may add additional criteria or metrics (e.g., other than IP address) on which the path selection algorithm may base path selection, in a way that allows for ordering routers having the specified criteria/metrics along an LSP without pinning the LSP to particular real hops. In this way, because the specific router to be used is not selected and specified beforehand, if a failure occurs the LSP can recover without intervention because the ingress router can dynamically re-set up the LSP via another router having membership in the same abstract hop. If one of the links or nodes along the path goes down, the network devices can easily select a different hop along the path that also satisfies the abstract hop membership, and can re-signal the LSP along the new path without needing to indicate an LSP failure or error to the entity requesting the LSP.

In one example, a method includes receiving, by a network device in a network via a configuration interface for configuring the network device, configuration information to define one or more abstract hops for which membership is defined as those network devices that satisfy a logical combination of one or more constituent attributes; determining, by the network device and based on network topology information, for each abstract hop of the one or more defined abstract hops, a respective set of one or more network devices in the network that qualify for membership in the abstract hop; receiving, by the network device, a request to establish a label switched path (LSP) from an ingress network device to an egress network device, wherein the request specifies, as a path constraint for the LSP, a plurality of hops in a defined order, wherein the plurality of hops includes the one or more abstract hops; and establishing an LSP along a path that includes a plurality of real hops that each respectively correspond to the plurality of hops in the defined order.

In another example, a network device includes a memory configured to store instructions; a configuration interface for configuring the network device; and one or more processors in communication with the configuration interface and the memory and configured to: receive, via the configuration interface, configuration information to define one or more abstract hops for which membership is defined as those network devices that satisfy a logical combination of one or more constituent attributes; determine, for each of the one or more defined abstract hops, a respective set of one or more network devices in a network that qualify for membership in the abstract hop based on network topology information for a network; receive a request to establish a label switched path (LSP) from an ingress network device to an egress network device of the network, wherein the request specifies, as a path constraint for the LSP, a plurality of hops in a defined order, wherein the plurality of hops includes the one or more abstract hops; and establish an LSP along a path that includes a plurality of real hops that each respectively correspond to the plurality of hops in the defined order.

In a further example, a non-transitory computer-readable device includes instructions that, when executed, cause one or more processors to: receive, via the configuration interface, configuration information to define one or more abstract hops for which membership is defined as those network devices that satisfy a logical combination of one or more constituent attributes; determine, for each of the one or more defined abstract hops, a respective set of one or more network devices in a network that qualify for membership in the abstract hop based on network topology information for a network; receive a request to establish a label switched path (LSP) from an ingress network device to an egress network device of the network, wherein the request specifies, as a path constraint for the LSP, a plurality of hops in a defined order, wherein the plurality of hops includes the one or more abstract hops; and establish an LSP along a path that includes a plurality of real hops that each respectively correspond to the plurality of hops in the defined order.

In yet another example, a method includes receiving, by a network device in a network via a configuration interface for configuring the network device, configuration information to define one or more abstract hops for which membership is defined as those network devices that satisfy a logical combination of one or more constituent attributes; determining, by the network device and based on network topology information, for each abstract hop of the one or more defined abstract hops, a respective set of one or more network devices in the network that qualify for membership in the abstract hop; receiving, by the network device, a request to compute a path from an ingress network device to an egress network device, wherein the request specifies, as a constraint for the path, a plurality of hops in a defined order, wherein the plurality of hops includes the one or more abstract hops; computing the path based on the specified constraint to obtain a computed path; and sending an indication of the computed path to a sender of the request.

The details of one or more examples of the techniques are set forth in the accompanying drawings and the description below. Other features, objects, and advantages of the techniques will be apparent from the description and drawings, and from the claims.

DETAILED DESCRIPTION

Figure 1:
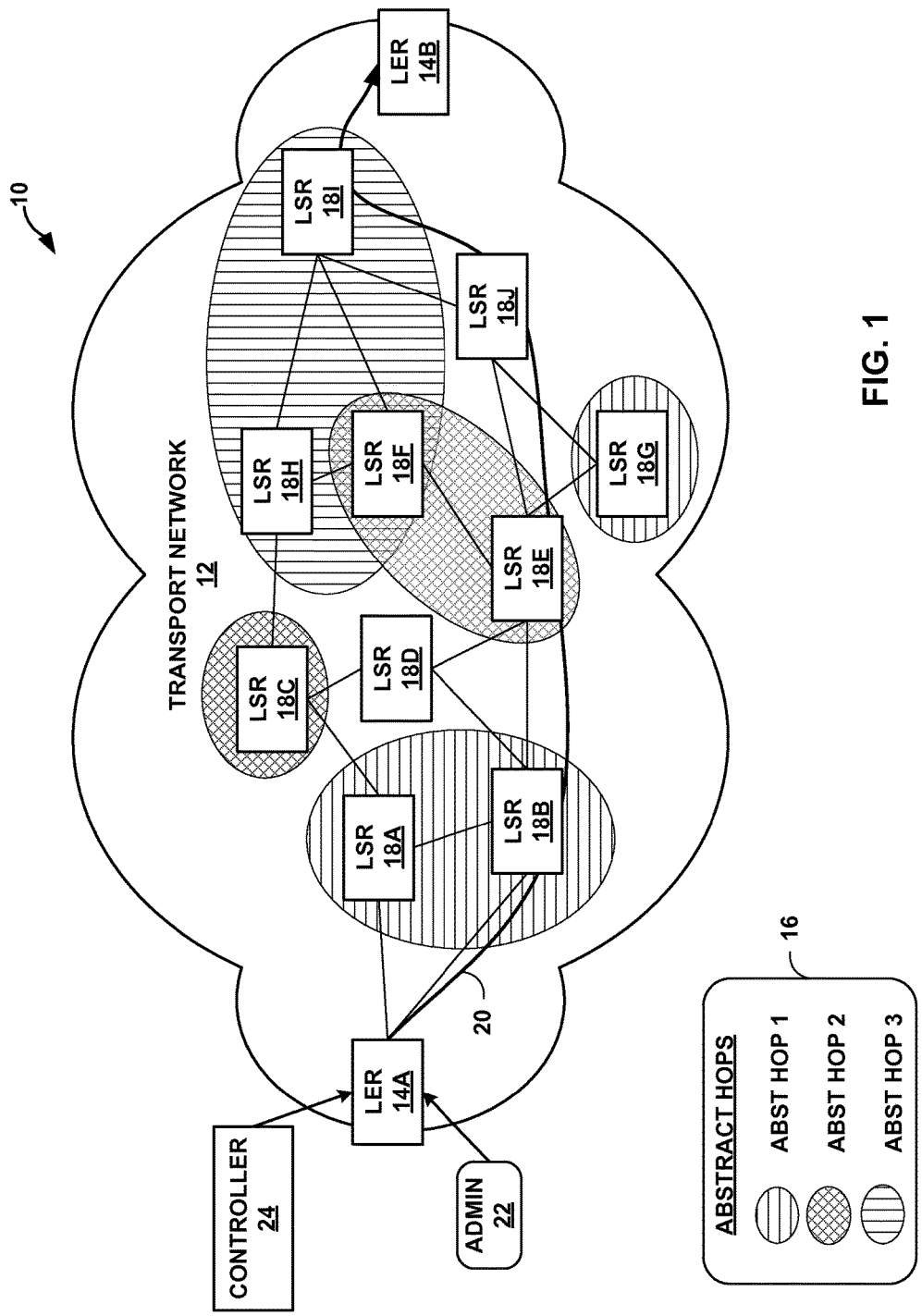
FIG. 1 is a block diagram illustrating an example network system that implements the ordered abstract hop path constraint techniques described in this disclosure.

FIG. 1 is a block diagram illustrating an example network system 10 that implements the ordered abstract hop techniques described in this disclosure. In the example of FIG. 1, network system 10 includes a transport network 12 that represents a network that transports packets or other data units between networks, such as customer networks (not shown). Transport network 12 may represent a service provider network that implements one or more multi-protocol label switching (MPLS) protocols, such as a resource reservation protocol (e.g., RSVP) or a label distribution protocol (LDP), to configure one or more label switched paths (LSPs) through transport network 12. These LSPs may be dedicated paths for use in communicating between two or more networks.

As shown in the example of FIG. 1, transport network 12 includes label edge routers (LERs) 14A, 14B ("LERs 14") and label switch routers (LSRs) 18A-18J ("LSRs 18"). In the example of FIG. 1, an administrator 22 of transport network 12 may configure LER 14A to establish an LSP 20 between LER 14A as an ingress LER and LER 14B as an egress LER. LERs 14 may, in some instances, be substantially similar to LSRs 18 in that the same type of device, e.g. a router, may perform the functions attributed to both LERs 14 and LSRs 18. LERs 14 perform a process referred to as "call admission control" to admit or deny packet flows or other traffic entry into LSPs originating from LERs 14. Typically, call admission control involves identifying a five-tuple associated with a packet and determining whether this five-tuple is associated with an LSP 20 or any other LSP for which LER 14A is the ingress, where the five-tuple includes a source address, a source port, a destination address, a destination port and a protocol. LSRs 18 switch MPLS packets via the associated one of the LSPs to which this MPLS packet has been admitted. Each LSR along the path of the LSP performs CAC when the LSP forwarding states are created using RSVP-TE signaling, though the manner in which the ingress LER performs CAC is normally different from that of the LSRs.

Typically, to establish or otherwise form LSP 20, each of LERs 14 and LSRs 18 exchange routing information that describes one or more routes through transport network 12. In this example, LERs 14 and LSRs 18 implement one or more of a type of routing protocol referred to as an interior gateway protocol (IGP). IGPs generally refer to a type or class of routing protocols used to exchange routing information within a given area or so-called "autonomous system." Transport network 12 is assumed to represent a single autonomous system, which may refer to a network composed of a collection of connected Internet protocol (IP) routing prefixes under the control of one or more network operators that presents a common, clearly defined routing policy.

Example IGPs include an Intermediate System to Intermediate System (IS-IS) routing protocol and an Open Shortest Path First (OSPF) routing protocols. Both of the IS-IS and OSPF routing protocols fall within a class of routing protocols referred to as link-state protocols. Link-state protocols generally advertise routing information via link state advertisements (LSAs). LSAs include data identifying a link between any two routers of transport network 12, along with data identifying various metrics describing a state of this link. For example, LSAs may include data defining an interface cost or metric associated with an interface to which the link connects and a link cost or metric associated with the link, as well as an administrative group, extended administrative group, or Shared Risk Link Group (SRLG) associated with the link and any other constraints commonly employed for selecting a path through a network in accordance with a link state protocol. The administrative group, extended administrative group, or SRLG associated with the link (sometimes referred to as "color") may provide a way by which an administrator can configure path selection.

For example, an administrator may assign one or more links a color of "red" and another one or more links a color of "blue." The administrator may then configure the path selection algorithm that selects from among the entire set of paths determined via link state advertisements to use only links that are associated with the color "red" for one customer and to use only links that are associated with the color "blue" for another customer, for example. In this manner, the administrator may configure groups of links for different uses. Commonly, administrators utilize these colors to differentiate between links that cannot be differentiated by more objective metrics. In this way, the color or administrative group has enabled what may be considered a more subjective metric or constraint of path selection for application to an overall path.

Usually, a hop constraint will be defined as an ordered set of IP addresses, whereas bandwidth/resource affinity constraints such as color or administrative group are applied to the whole path without any order.

The techniques of this disclosure introduce the concept of "abstract hops," which provides a mechanism for applying this type of subjective constraint to a path on a finer grained, hop-by-hop basis, rather than requiring the entire path to meet the subjective constraint requirement. The techniques also provide the ability to define ordering among abstract hops, so that a path can be requested along any hops that meet particular subjective constraints in a defined order.

This allows for computing paths that satisfy administrative group order as a constraint in addition to the traditional constraints for computing paths. In other words, the "constraint set" can be an ordered set containing (a) IP addresses of hops and/or (b) admin-group representing a region. This is referred to as an "abstract hop order" constraint. One motivation for providing admin-group or other abstract hops representing a region in an "abstract hop order" constraint is to prevent the situation where node failures could make a user-specified "hop order" unviable. If the "abstract hop order" consists of an administratively defined grouping of resources in the network, then the "constraint set" is more likely to remain valid even after link or node failures in the network.

Abstract hops, which may also be referred to as "regions" or "region hops," are "fuzzy" constraints, in that they are defined by constituent attributes that do not themselves identify particular network devices. This is in contrast to Internet Protocol (IP) subnets, for example, which by definition identify particular network devices. The link/node attributes whose combination makes up the abstract hop are referred to herein as "constituent attributes." The network devices that satisfy the abstract hop definition are the "constituents" of the abstract hop. In other words, the constituent attributes are attributes of the constituents of the abstract hop. Abstract hops can be defined in terms of logical combinations (which may be exclusions) of any other type of link or node attributes. The types of link or node attributes that are used to define abstract hops may be attributes that are typically exchanged via interior gateway protocols (IGP) Traffic Engineering (TE) updates. In some examples, abstract hops may be defined in terms of, for example, administrative groups, extended administrative groups (EAGs), shared risk link groups (SRLG), or other groupings. Abstract hops can be defined as a logical combination of constituent attributes of same or different types. In some examples, the abstract hops are defined locally on an ingress device of a network (e.g., by an administrator 22 or received from a centralized controller 24), such as LER 14A, and abstract hop definitions are not exchanged via IGP updates.

As shown by legend 16 of FIG. 1, some of LSRs 18 are mapped to one or more abstract hops referred to as abstract hop 1, abstract hop 2, and abstract hop 3. Router membership in an abstract hop may be unrelated to the network/IGP topology for the network that includes the router. For instance, LSR 18H and 18G that are both members of abstract hop 3 may, for instance, be members of different IP subnets advertised by an IGP or logically located within different IGP areas, e.g., OSPF areas, that may or may not share an area border router.

The phrase "path selection" generally refers to an algorithm implemented by various protocols to resolve routing information (which in this example is advertised via LSAs) to select a path through the network. Typically, LERs 14 and LSRs 18 exchange LSAs that describe links known to LERs 14 and LSRs 18, e.g., either by way of directly connecting to these links or by way of another LSA. LERs 14 and LSRs 18 then form a graph or other data structure to store the routing information in a manner that reflects the topology of transport network 12. That is, LERs 18 and LSRs 18 may form a graph data structure with each node of the graph representing a different one of LERs 14 and LSRs 18 and each pointer or so-called "edge" interconnecting two nodes of the graph representing a different link between a corresponding two of LERs 14 and LSRs 18. Each pointer or edge of the graph may be associated with a cost or other edge value that reflects the costs advertised via LSA 20 for each of the associated links. LERs 14 and LSRs 18 may then implement a substantially similar, if not the same, path selection algorithm to determine a path through the network for each source and destination of data packets.

In the context of transport network 12, LERs 14 and LSRs 18 implement a path selection algorithm identified by one of the MPLS protocols. Typically, MPLS protocols, especially those that provide a traffic engineering aspect, such as RSVP with traffic engineering extensions (RSVP-TE) implement a path selection algorithm referred to as constrained shortest path first (CSPF) path selection algorithm. The CSPF path selection algorithm differs from the generic shortest path first (SPF) path selection algorithm in that the CSPF path selection algorithm first prunes those links that violate a given set of constraints.

An administrator may configure each of LERs 14 and LSRs 18 to define the set of constraints so as to achieve a particular administrative or network goal, such as avoiding links having a certain high cost, which may achieve a latency goal by avoiding high cost links. After pruning these links from consideration, the CSPF path selection algorithm selects a path in a manner substantially similar to how the SPF path selection algorithm operates, e.g., by finding a lowest cost path from each node to every other node in each pass of the algorithm.

A user interface is described herein that supports a syntax allowing an administrator to define a local ingress-only behavior to specify more flexible CSPF constraints. The syntax can allow an administrator to define abstract hops in terms of constituent attributes. The syntax can also allow an administrator to specify a particular order of abstract hops from which actual router hops ("real hops") along an LSP are to be selected when the LSP is set up. That is, the syntax can be used to designate one or more regions/abstract hops (e.g., as specified by administrative group or color) as respective hop constraints in pre-defined orders along an LSP to be set up. The configured router can pre-process the abstract hop definitions to obtain abstract hop constituent lists that indicate real hops, i.e., individual network devices identifiable by a network address, that are members of an abstract hop container.

In some examples, LER 14A includes a user interface that supports a syntax that allows administrator 22 to configure LER 14A with user-defined abstract hops that can be used as path constraints for setting up LSP 20. An abstract hop is a logical container that includes a set of one or more routers that satisfy a logical combination of one or more link and/or node attributes ("constituent attributes"). The techniques described herein provide a syntax that allows administrator 22 to define an abstract hop as a group of routers meeting a logical combination of constituent attributes, and enables the administrator 22 to specify path constraints for LSP 20 by ordering among abstract hops in the path constraint specification.

In some examples, LER 14A receives one or more abstract hop definitions from centralized controller 24, which may be an external path computation entity (PCE) such as that described in Medved, et al., U.S. Pat. No. 8,885,463, entitled "Path Computation Element Communication Protocol (PCEP) Extensions for Stateful Label Switched Path Management," issued Nov. 11, 2014, the entire contents of which are incorporated by reference herein. For example, controller 24 may include a PCE that establishes PCE communication protocol (PCEP) sessions with one or more path computation clients (PCCs), and LER 14A may include one of the PCCs. The PCC of LER 14A may issue path computation requests to the PCE of controller 24 using its PCEP session. The PCE of controller 24 applies constraints provided in a path computation request to compute the path of a TE LSP through a path computation domain that satisfies the constraints. Controller 24 then returns the path to the requesting PCC of LER 14A. While described below for purposes of example with respect to configuration information received from administrator 22, similar configuration information may be received from controller 24.

Administrator 22 can associate a unique identifier with each abstract hop definition. Administrator 22 can use the identifier for referring to the abstract hop, along with real IP hops, when specifying a path constraint. In the example of FIG. 1, administrator 22 can define a first abstract hop called "Abst Hop 1" in terms of one or more link or node attributes, and LER 14A determines based on stored network topology information that LSR 18A, LSR 18B, and LSR 18G are members of Abst Hop 1. Administrator 22 can define a second abstract hop called "Abst Hop 2" in terms of one or more link or node attributes, and LER 14A determines based on stored network topology information that LSR 18C, LSR 18E, and LSR 18F are members of Abst Hop 2. Administrator 22 can define a third abstract hop called "Abst Hop 3" in terms of one or more link or node attributes, and LER 14A determines based on stored network topology information that LSR 18F, LSR 18H, and LSR 18I are members of Abst Hop 3. In some examples, LER 14A can store this information to an abstract hop constituent list data structure.

Abstract hops may be defined as a logical combination of constituent attributes. To facilitate this, we use the concepts of "constituent-any-list" and "constituent-all-list." Constituent-any-list is a list of constituent attributes where any one of them should be met to satisfy the overall constituent list criteria. Constituent-all-list is a list of constituent attributes where all of them have to be met to satisfy the overall constituent list criteria. The constituent attributes in the list (any/all) could be of same or different types.

This is similar to include-any and include-all constructs that are allowed for configuration of admin groups. The difference here is that the corresponding constituent constructs can contain any kind of link/node attribute and not just admin groups. As one example, the constituent construct can include SRLG in addition to admin groups.

Include-any or include-all constructs may be nested, in some examples. In some examples, one level of nesting may be enabled for the corresponding constituent list constructs, by defining the abstract hop as a list of one or more of such constituent lists. In other words, the abstract hop itself can be as an OR-list or AND-list where each element is a constituent-all-list or a constituent-any-list.

Permitting one level of nesting enables such combinations as follows to define an abstract hop:
((A AND B) OR (C AND D))
((A OR B) AND (C AND D))

When an abstract hop is defined as an OR-list, at least one of the constituent-all/any-lists in it should be satisfied by a link/node to claim that it belongs to the abstract hop. When an abstract hop is defined as an AND-list, all of the constituent-any/all-lists in it should be satisfied by the link/node to claim that it belongs to the abstract hop.

Network devices may also be configured to allow a constituent-list to be excluded. This means that if any of the elements in the constituent list are true for a link, the link will be excluded from abstract hop membership. Therefore the "from" and "to" nodes also will be excluded if there are no other links between the two nodes that satisfy the abstract hop.

When a link belongs to an abstract hop or the link has a certain abstract hops membership, the link's "from" and "to" nodes are considered to belong to that abstract hop. When an abstract hop's constituents are purely node-attributes, it is not applicable to links and the membership check is to be done only against nodes.

An example node attribute is node-admin-tag. Abstract hop is a link/node attribute local to the ingress node where the abstract hop is defined.

The syntax supported by LER 14A can also allow administrator 22 to specify a particular order of abstract hops from which LER 14A selects actual router hops ("real hops") for establishing LSP 20. That is, the syntax can be used to designate one or more abstract hops as respective hop constraints in pre-defined orders along an LSP to be set up. In some examples, the hop constraints can define an order of a plurality of hops that includes one or more abstract hops as well as one or more real hops. Moreover, administrator 22 can specify the abstract hops as strict constraints or loose constraints in the defined order.

For example, LER 14A may receive, from administrator 22 or controller 24, a request to establish an LSP 20, where the request specifies, as a constraint for the LSP, a plurality of hops in a defined order as follows: Ingress, Abst Hop 1, Abst Hop 2, LSR 18J, Abst Hop 3, Egress. In this example, the request specifies both abstract hops and real hops (LSR 18J being an example of a specified real hop). LER 14A performs path selection and uses the abstract hop constituent list data structure to select a path through LERs that satisfies the ordered path constraint. In the example of LSP 20, to meet the constraint for LSP 20 LER 14A selects a path along real hops LER 14A, LSR 18B, LSR 18E, LSR 18J, and LSR 18I, LER 14B.

LER 14A may pre-process the defined abstract hops to determine real hops that are members of the abstract hops. For example, LER 14A processes the abstract hops to determine that members of Abstract Hop 1 include LSRs 18A, 18B, and 18G; members of Abstract Hop 2 include LSRs 18C, 18E, and 18F; and members of Abstract Hop 3 include LSRs 18F, 18H, and 18I.

LER 14A executes a traffic-engineering MPLS protocol that supports an explicit routing capability, such as RSVP-TE or CR-LDP. In some examples, LER 14A determines an explicit route object (ERO) based on the specified ordered hop constraints, and includes the ERO into RSVP Path messages sent to other LSRs along a selected path to LER 14B. The ERO encapsulates a concatenation of hops which constitutes the explicitly routed path. According to the techniques of this disclosure, LER 14A can determine the hops to be specified by the ERO based on one or more locally-defined abstract hops, as well as one or more real hops. Using the ERO, the paths taken by label-switched RSVP-MPLS flows can be pre-determined, independent of conventional IP routing. The explicitly routed path can be administratively specified, such as by an administrator 22, or automatically computed by controller 24 based on QoS and policy requirements, taking into consideration the prevailing network state. In this way, using explicitly routed LSPs, LER 14A can control the path through which traffic traverses from itself, through the transport network 12, to the egress LER 14B. Ingress LER 14A can use explicit routing with abstract hop constraints to improve utilization of network resources, provide more robust paths, and enhance traffic oriented performance characteristics. Here, LER 14A can send an RSVP-TE Path message containing an ERO that specifies: LER 14A, LSR 18B, LSR 18E, LSR 18J, and LSR 18I, LER 14B, to establish LSP 20, and may receive from LER 14B an RSVP-TE Resv message containing an RRO with the same path, to confirm establishment of LSP 20.

In some examples, LER 14A does not propagate the user defined abstract hop itself to other LSRs in network 12 via IGP TE updates. The abstract hop definition is local to the computing node or ingress of the LSP being setup. The techniques of this disclosure therefore do not require any IGP TE protocol extensions.

In some aspects, administrator 22 may configure abstract hops and request LSPs according to one or more path constraints according to one or more of the following examples. Consider the administratively configured grouping of network resources (link or node) as an "abstract hop" having an identifier called "abstract hop identifier." Each node in the network may be a member of one or more "abstract hops." If a node belongs to two "abstract hops" then the node is said to belong to the "abstract hop intersection" set identified by the concatenation of the two "abstract hops." In some examples, LER 14A may be configured to, in response to receiving configuration information defining abstract hops, determine which routers are members of each abstract hop, i.e., an abstract hop set. In some examples, LER 14A may be configured to, in response to receiving configuration information defining abstract hops, determine abstract hop intersection sets. The requirement is to compute a path given a strict or loose order of abstract hops. An "abstract hop order" constraint is an ordered set of abstract hop identifiers provided by a user for path computation. Example constraints are given below.

Example A: {A B C}—Strict order of abstract hops A, B and C
  a. Traverse one or more resources of abstract hop A
  b. Traverse one of more resources of abstract hop B
  c. Traverse one or more resources of abstract hop C
  d. Traverse one or more resources of any abstract hop excluding A, B and C to reach destination Example B: {A B+C}—Notation "+" denotes "loose" order
  a. Traverse one or more resources of abstract hop A
  b. Traverse one or more resources of abstract hop B if there is a router connecting abstract hops A and B (i.e., a router in the abstract hop intersection of A and B) Otherwise, traverse one or more resources of any abstract hop other than A and C before traversing abstract hop B
  c. Traverse one or more resources of abstract hop C
  d. Traverse one or more resources of any abstract hop other than A, B and C to reach destination Example C: {A B* C}—Notation "*" denotes "optional"
  a. Traverse one or more resources of abstract hop A
  b. Preferably traverse one or more resources of abstract hop B If possible traverse one or more resources of abstract hop C skipping B (for example, ABC and AC are valid orders)

c. Traverse one or more links of any abstract hop excluding A, B and C to reach destination Example D: {A* B* C}—Ordered set where C must be traversed by either traversing A, or B or both or none.

a. Preferably traverse one or more resources of abstract hop A b. If possible traverse one or more resources of abstract hop B skipping A c. If possible traverse one or more resources of abstract hop C skipping A or/and B d. Traverse one or more links of any abstract hop to reach destination Although described for purposes of example as including a single LSP 20, transport network 12 may include many LSPs, and ingress LER 14A may establish multiple LSPs with different ordered abstract hop constraints according to requests from administrator 22 or controller 24. Although described for purposes of example with respect to Point-to-point (P2P) LSPs, the techniques of this disclosure may be applied to establishing other types of LSPs, such as Point-to-Multipoint (P2MP) LSPs, externally controlled LSPs, bidirectional LSPs, and dynamic LSPs, for example.

Figure 2:
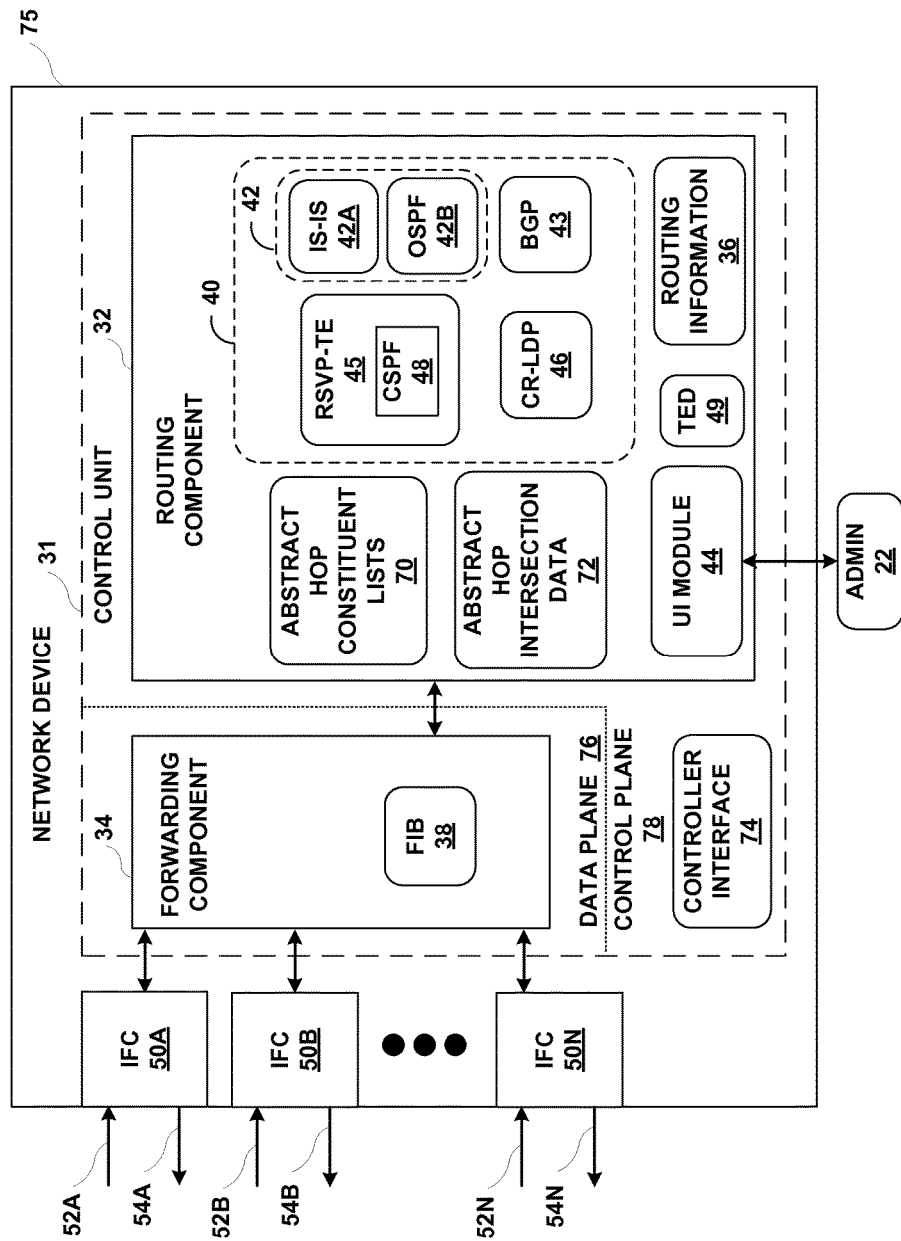
FIG. 2 is a block diagram illustrating an example network device that implements techniques described in this disclosure.

FIG. 2 is a block diagram illustrating an example network device 75 that implements techniques described in this disclosure. Network device 75 may represent either one of LERs 14 or one of LSRs 18 shown in the example of FIG. 1. While described with respect to network device 75, the techniques may be implemented by any other type of network device capable of implementing an interior gateway protocol (IGP) such as the IS-IS routing protocol or the OSPF routing protocol. Thus, while described with respect to network device 75, the techniques should not be limited to example network device 75 described with respect to the example of FIG. 2.

In this example, network device 75 includes a control unit 31 that includes a routing component 32 and a forwarding component 34. In the example of FIG. 2, network device 75 includes interface cards 50A-50N ("IFCs 50") that receive and send data units, such as packet flows, via network links 52A-52N and 54A-54N, respectively. Network device 75 may include a chassis (not shown) having a number of slots for receiving a set of cards, including IFCs 50. Each card may be inserted into a corresponding slot of the chassis for electrically coupling the card to forwarding component 34 and/or routing component 32, e.g., via a high-speed switch and internal data paths (not shown). IFCs 50 may be coupled to network links 52A-52N and 54A-54N via a number of physical interface ports (not shown). Generally, IFCs 50 may each represent one or more network interfaces by which network device 75 may interface with links of a network, such as the links of network 12 shown in the example of FIG. 1.

Control unit 31 of network device 75 includes a control plane 78 and a data plane 76. In the example of FIG. 2, data plane 76 includes forwarding component 34, and control plane 78 includes routing component 32 and controller interface 74. Control unit 31 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 31 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Routing component 32 may include a user interface (UI) module 44 ("UI module 44"), one or more network protocols 40. UI module 44 may represent a module that presents a user interface with which an administrator or other user, such as administrator 22 ("admin 22"), may interact to configure one or more of routing protocol modules 40, RSVP-TE module 45, as well as routing component 32 generally.

As described herein, UI module 44 supports a syntax that allows administrator 22 to configure network device 75 by defining abstract hops that can be used as path constraints for setting up LSPs. The techniques of this disclosure provide a syntax that allows administrator 22 to define an abstract hop as a group of routers meeting a logical combination of constituent attributes, and enables the administrator 22 to specify path constraints for LSPs by ordering among abstract hops in the path constraint specification. In some examples, network device 75 receives one or more abstract hop definitions from centralized controller via controller interface 74.

Routing component 32 primarily provides an operating environment for control plane protocols 40. For example, one or more interior gateway protocols (IGPs) 42, such as Intermediate System to Intermediate System (ISIS) routing protocol 42A, or the Open Shortest Path First (OSPF) routing protocol 42B, or Border Gateway Protocol (BGP) 43, maintain routing information 36 to reflect the current topology of a network and other network entities to which network device 75 is connected. In particular, IGPs 42 or BGP 43 can update routing information 36 to accurately reflect the topology of the network and other entities. IS-IS module 42A represents a module that implements the IS-IS routing protocol. OSPF module 42B represents a module that implements the OSPF routing protocol.

Routing component 32 generates and programs forwarding component 34 with FIB 38 that associates network destinations with specific next hops and corresponding interfaces ports of IFCs 50 in accordance with routing information 36. Routing component 32 may generate FIB 38 in the form of a radix tree having leaf nodes that represent destinations within the network, for example.

Based on FIB 38, forwarding component 34 forwards packets received from inbound links 52A-52N to outbound links 54A-54N that correspond to next hops associated with destinations of the packets. U.S. Pat. No. 7,184,437 provides details on an exemplary embodiment of a router that utilizes a radix tree for route resolution. The entire contents of U.S. Pat. No. 7,184,437 are incorporated herein by reference.

In one example, forwarding component 34 is a rich and dynamic shared forwarding plane, optionally distributed over a multi-chassis router. Moreover, forwarding component 34 may be provided by dedicated forwarding integrated circuits normally associated with high-end routing components of a network router. Further details of one example embodiment of Network device 75 can be found in U.S. Pat.

No. 8,339,959, issued Dec. 25, 2012, entitled "STREAMLINED PACKET FORWARDING USING DYNAMIC FILTERS FOR ROUTING AND SECURITY IN A SHARED FORWARDING PLANE," the entire contents of which are incorporated herein by reference.

As shown in FIG. 2, protocols 40 executing within routing component 32 includes one or more MPLS protocols for establishing a LSP, which may be accumulated by IGPs 42. For example, RSVP-TE 45 may generate and maintain a traffic engineering database 49, including bandwidth reservations for paths associated with MPLS LSPs. Constrained Shortest Path First (CSPF) process 48 computes a shortest path or paths for an MPLS LSP based on specified constraints and bandwidth availability information associated with the links within the network. IGPs 42 may, in turn, advertise the calculated bandwidth availability information in traffic engineering database (TED) 49 to other peer routers. As another example, constrained Label Distribution Protocol (CR-LDP) 46 may send and receive label mapping messages for establishing a LSP. Although generally described for purposes of example herein with respect to RSVP-TE, the techniques of this disclosure can be used with other MPLS protocols, such as CR-LDP 46, for example.

Network device 75 can use an MPLS protocol such as RSVP-TE module 45 or CR-LDP 46 to send and receive messages for establishing LSPs. RSVP-TE module 45 may also inform IGPs 42 of the established LSPs, which in turn can update TED 49 with current available bandwidth information. IGPs 42 may also forward the updated current available bandwidth information to other IGP peers.

RSVP-TE module 45 may also store MPLS labels to FIB 38 for LSPs 20. FIB 38 may correlate labels associated with incoming MPLS packets with next hops. FIB 38 may include entries associated with an incoming label (e.g., a label at the top of a label stack appended to a packet received by IFCs 50) and an operation or action to take with respect to that incoming label before forwarding the packet to the specified next hop, such as push a new label onto the label stack, swap the incoming label with a label associated with the corresponding entry, or pop the incoming label from the label stack.

While described above as discrete modules 42-46, the modules may be combined to form a single module or unit or may be implemented separately as distinct hardware or software units or components. Reference to individual modules is not meant to reflect actual discrete implementations, and more than one module may be implemented by the same hardware or combination of hardware or software.

Initially, admin 22 may interface with a user interface, such as a command line interface (CLI) or graphical-user interface (GUI), presented by UI module 44 to configure one or more of interior routing protocol modules 46. When configuring these protocols 46, admin 22 may input data defining one or more abstract hops in accordance with the techniques described in this disclosure. In configuring these protocols 46 in accordance with the techniques described in this disclosure, admin 22 may define an identifier for a given abstract hop, and may associate this identifier with a color or other name or handle. In some examples, the abstract hop identifier can be an unsigned 32-bit number that is unique across the network.

After configuring one or more of protocols 46 in this manner, admin 38 may also interface with a user interface presented by UI module 44 to configure RSVP-TE module 45. In particular, admin 22 may input configuration data via this user interface that configures a constrained shortest path first (CSPF) algorithm executed by RSVP-TE module 45 (which is shown in the example of FIG. 2 as "CSPF 48") to resolve routing information 36 in order to generate MPLS forwarding table 54. This configuration data to configure CSPF 48 may specify constraints CSPF module 48 is to evaluate when resolving routing information 36. These constraints may include one or more abstract hops that were pre-defined by admin 22. Admin 22 may therefore configure CSPF module 48 to consider or otherwise evaluate or assess abstract region hops when pruning routing information 36 prior to selecting the shortest path, where length is typically measured in cost associated with each path. Admin 22 may also interface with UI module 44 to input link data associating one or more links with affinities, such as administrative groups and/or extended administrative groups, as well as, other costs or metrics. This is described in further detail in the examples below. UI module 44 may store this link data to routing information 36 as a new entry or may update routing information 36 based on the input link data to reflect the new metrics or costs defined by this link data for the corresponding links, for example.

After configuring routing component 32 in this manner, admin 22 may then activate or otherwise enable network device 75 to begin processing packets, including standard IP packets that are forwarded in accordance with forwarding information 52 and label augmented IP packets (which are referred to herein as "MPLS packets") that are forwarded in accordance with MPLS forwarding tables 54. Prior to receiving these packets, in some examples one or more of interior routing protocol modules 42 may generate an LSA that includes data specifying one or more links, costs associated with the one or more links and other metrics associated with these links, such as an Administrative Group or Shared Risk Link Group.

Network device 75 may also receive LSAs via IFCs 50 from other LERs or LSRs, such as LERs 14 or LSRs 18. IFCs 50 may be configured to forward routing protocol packets or control packets, such as these received LSAs, via switch 40 to routing component 32. Interior routing protocol modules 46 may then process these LSAs. This one of interior routing protocol modules 42 then stores link data, including its costs and other metrics to routing information 36.

In response to updating routing information 36, RSVP-TE module 45 may resolve routing information 36 or portions thereof (as routing information 36 may be divided into many different routing instances, such as a MPLS traffic engineering routing instance, an IP routing instance, etc.) to generate one or more of forwarding information 42 and MPLS forwarding tables 54. In response to updating an MPLS routing instances, such as an RSVP-TE routing instance, RSVP-TE module 45 may invoke CSPF 48, which resolves its corresponding portion of routing information 36 in accordance with the configuration data entered by admin 22 to generate MPLS forwarding tables 54. RSVP-TE module 45 may then configure or otherwise update IFCs 50 with the newly resolved MPLS forwarding table 54, replacing the older MPLS forwarding tables 54. IFCs 50 may continue to receive and forward IP packets and MPLS or labeled packets in accordance with forwarding information 52 and MPLS forwarding tables 54, respectively.

According to the techniques of this disclosure, the hops specified by the resource reservation message may include one or more real hops selected based on locally-defined abstract hops. For example, network device 75 sends RSVP-TE Path message(s) to LSR 18B for setting up LSP 20. In response, RSVP-TE module 45 receives RSVP-TE Resv messages from LSR 18B confirming the reservation of the requested bandwidth. In accordance with RFC 3209 (referenced above), RSVP-TE module 45 supports an explicit routing capability. RSVP-TE module 45 does this by incorporating a simple explicit route object (ERO) into RSVP Path messages.

Using the ERO, the paths taken by label-switched RSVP-MPLS flows can be pre-determined, independent of conventional IP routing. The explicitly routed path can be administratively specified, such as by an administrator 22 via UI module 44, or automatically computed by controller 24 (FIG. 1) based on QoS and policy requirements, taking into consideration the prevailing network state. Thus, in some examples RSVP-TE module 45 can receive configuration via controller interface 74, which can interface with controller 24 (FIG. 1). In this way, using explicitly routed LSPs, when network device 75 is at the ingress edge of an MPLS domain, network device 75 can control the path through which traffic traverses from itself, through the MPLS network, to an egress node. Network device 75 can use explicit routing with abstract hop constraints to improve utilization of network resources and enhance traffic oriented performance characteristics.

Network device 75 may be, for example, a node that is computing a path for an LSP, such as LER 14A computing a path for LSP 20. TED 49 in the computing node can be viewed as including abstract hop "regions" where each region has real nodes with given abstract hop membership. Some of the regions could be disjoint, while some could be overlapping, allowing for nodes that belong to intersections. Some regions could completely encompass others, and so on.

Routing component 32 (e.g., RSVP-TE module 45) of network device 75 (FIG. 2) can perform pre-processing of the abstract hop definitions received via UI module 44 or controller interface 74 to obtain abstract hop membership lists ("constituent lists"), which list real hops that qualify as members of the defined abstract hops, as determined by routing component 32. RSVP-TE module 45 can store the constituent lists to abstract hop constituent lists 70. In some examples, network device 75 determines the abstract hop constituent lists based on TED 49, which includes network topology information that may be received from controller 24, and/or from IGP update messages received from IGP peer network devices via one of IGPs 42. In some examples, routing component 32 may pre-compute the membership of network devices in intersections of one or more abstract hops, and store this information as abstract hop intersection data 72. This may allow routing component 32 to more quickly set up paths that have path constraints specified in terms of intersections of abstract hops. In some examples, network device 75 may receive abstract hop constituent lists and abstract hop intersection data from controller 24 via controller interface 74.

In some examples, before starting path computation, the RSVP-TE module 45 of network device 75 may pre-process the "abstract hop order" constraint set. For example, RSVP-TE module 45 creates abstract hop constituent lists 70, e.g., a database which is a tree of abstract hop sets keyed by "abstract hop identifier" and each tree entry will point to a table containing all nodes belonging to that "abstract hop." Network device 75 should remove itself from these sets.

For example, RSVP-TE module 45 may create one table corresponding to each abstract hop found in "abstract hop order". This table will contain all nodes belonging to that abstract hop. RSVP-TE module 45 can create the tables using the information available in TED 49, and store the tables to abstract hop constituent lists 70. If links in the network are grouped administratively into abstract hops, then a node having links belonging to more than one abstract hops will be present in the respective tables of those abstract hops. On the other hand, if nodes are tagged to be part of abstract hops, then a node that is tagged to be part of one abstract hop will be present in the table of that abstract hop only.

RSVP-TE module 45 may also creates "abstract hop intersection" tables, and store these as abstract hop intersection data 72, which may be a database that is a tree of abstract hop set intersections keyed by concatenation of abstract hops. An "abstract hop intersection" table contains all nodes that belong to two consecutive abstract hops in "abstract hop order". For example, given an order {A B C}, the computing node will create a two "abstract hop intersection" tables that contain the nodes that belong to A∩B and B∩C. An "abstract hop intersection" table is a list of "border" nodes connecting the two abstract hops. If abstract hops are created out of links, then computing "abstract hop intersection" is simply finding out nodes that have links in two abstract hops. If the abstract hops are created by tagging each node with a group identifier, then computing "abstract hop intersection" requires the pre-processing stage to deduce which "abstract hop intersection" tables that a node should belong to by determining the membership of neighboring nodes on other end of the links of the node.

If two consecutive abstract hops A and B are qualified as "strict", then "abstract hop intersection" table will contain nodes that belong to A∩B. If A∩B is empty, then the path computation should be considered as having failed. A non-empty A∩B will provide a set of "border" nodes connecting abstract hops A and B.

In some examples, if an abstract hop B is qualified as "loose" and if the previous abstract hop is A in the "abstract hop order", and if A∩B is empty, RSVP-TE module 45 should execute the following procedure to determine "abstract hop intersection" tables: (1) Find the list of abstract hops that abstract hop A is adjacent to. Any abstract hop X should be included in the list if A∩X is non-empty. From this list of abstract hops, remove B. (2) Find the list of abstract hops that abstract hop B is adjacent to. Any abstract hop Y should be included in the list if A∩Y is non-empty. (3) At this point, there will be two composite sets—one set containing all "next" abstract hop for A and the corresponding "border" nodes for each of the "next" abstract hop. The second composite set will contain all "previous" abstract hop for B and the corresponding "border" nodes for each of "previous" abstract hop.

In some examples, if an abstract hop B is qualified as "optional" and if the previous abstract hop is A, then RSVP-TE module 45 executes the following procedure. At the end of these procedures, there will be multiple composite sets depending on whether there is more than one "optional" abstract hop occurs in "abstract hop order" consecutively. (1) Get the next "optional" abstract hop after A and name it P. (2) Execute the same procedure assuming P is "loose" abstract hop. This will provide two composite sets as specified above. (3) If the next abstract hop in abstract hop order after P is also "optional", then go back to step (1).

The computing node has computed a "derived" abstract hop order(s) where each member of "derived" order will itself contain a list of "border" nodes. The following are examples.

For an order {A B C}, one probable "derived" abstract hop order is shown below. IngNode is Ingress node. {Border (A, B): A} is a set of "border" nodes connecting abstract hops A and B and the resource affinity constraint for plain CSPF is A.

```
{
    IngNode,
    {Border(A, B): A},
    {Border(B, C): B},
    EgrNode
}
```

For abstract hop order {A B+C}, one probable "derived" order may be as shown below assuming A is connected to P & Q, and B is connected to X & Y.

```
DerivedOrder1 =
{
    IngNode,
    {
        {Border(A, P)},
        {Border(B, X)},
    }
    {Border(B, C): B},
    EgrNode
}
DerivedOrder2 =
{
    IngNode,
    {
        {Border(A, P)},
        {Border(B, Y)},
    }
    {Border(B, C): B},
    EgrNode
}
DerivedOrder3 =
{
    IngNode,
    }
        {Border(A, Q)},
        {Border(B, X)},
    }
    {Border(B, C): B},
    EgrNode
}
DerivedOrder4 =
{
    IngNode,
    {
        {Border(A, Q)},
        {Border(B, Y)},
    }
    {Border(B, C): B},
    EgrNode
}
```

For abstract hop order {A B*C}, there will be two "derived" abstract hop orders as shown below—assuming A is connected to X and B is connected to Y.

```
DerivedOrder1 =
{
    IngNode,
    {
        {Border(A, X)},
        {Border(B, Y)},
    }
    {Border(B, C): B},
    EgrNode
}
DerivedOrder2 =
{
    IngNode,
    {Border(A, C): A},
    EgrNode
}
```

RSVP-TE module 45 performs the path computation next using the "derived" abstract hop order(s) computed in pre-processing state. As the actual path connecting the border nodes in the "derived" abstract hop order set will not be available in TED 49, the algorithm should compute those paths. In other words, these paths may be considered as dynamically computed "virtual links" connecting the border nodes.

The following is an example path computation algorithm that RSVP-TE module 45 may use. The algorithm uses depth-first exploration method on the "derived" abstract hop order that is obtained from pre-processing. The choice of depth-first exploration approach is to provide the option of returning "non-best" path that satisfied the abstract hop order constraint. If best path is requested, then all possible "virtual links" are computed on demand, and all paths are explored where border nodes are the "vertices" and dynamically computed "virtual link" between border nodes as "edges" in the graph. For example, instead of computing CSPF from StartNode to closest node, CSPF module 48 may compute a tree using Djikstra's algorithm to all nodes and populate the cache.

As an optimization RSVP-TE module 45 of the computing Ingress node can cache the "virtual links" whose path is computed on demand but not selected as being part of the final end-to-end path. Such "virtual links" (between border nodes in the network) will be current in the cache as long as there is no TED change impacting the "virtual links". This is an optimization approach that trades off memory for compute resource.

The RSVP-TE module 45 of the computing node can alternatively choose to run CSPF computation for "virtual links" traversing different abstract hops in parallel to reduce compute time. Considering the example above, RSVP-TE module 45 of the computing IngNode may run the following CSPFs in parallel and finally running CSPF with border nodes as vertices and "virtual links" as edges.

IngNode→Border(A, P)
IngNode→Border(A, Q)
Border(A, P)→Border(B, X)
Border(A, P)→Border(B, Y)
Border(A, Q)→Border(B, X)
Border(A, Q)→Border(B, Y)
Border(B, X)→Border(B, C):B
Border(B, Y)→Border(B, C):B
Border(B, C)→EgrNode In some examples, RSVP-TE module 45 may choose the optimization method from the above options based on the availability of surplus memory and compute resources for the computing node.

If 'R' is the average number of abstract hops in the "derived" abstract hop order(s), 'B' is the average number of border nodes between any two abstract hops, 'N' is the total number of nodes in the network, then the complexity of the algorithm is $O(B*R*N \log N)$.

When constituent attributes of link change in TED 49, the abstract hop mappings stored in abstract hop constituent lists 70 become stale. Routing component 32 may be configured to periodically update the abstract hop constituent lists 70.

In some examples, network device 75 receives a path computed by an external PCE, such as on a PCEP session from controller 24 via controller interface 74, where the path conforms to a specified abstract hop constraint. Network device 75 may then establish an LSP along the received path. In other examples, CSPF module 48 of network device 75 computes the path in accordance with the abstract hop constraint, as described in further detail below. Although described for purposes of example in terms of CSPF module 48 of network device 75 computing the path, controller 24 may use similar techniques for computing a path based on an abstract hop constraint, in accordance with the techniques of this disclosure.

When real hops are provided as a path constraint, the CSPF computation performed by CSPF module 48 involves as many passes as the number of hops in the path constraint where each pass ends on reaching a hop in the constraint list. The starting point for each pass is the destination of the previous pass, with the first pass using ingress as the start.

When path constraint involves strict or loose abstract hops, CSPF computation by CSPF module 48 comprises of passes where each pass is to process the subsequent abstract hop in the constraint list. The requirement is to maintain the order among the abstract hops as specified in the path constraint.

In order to maintain the order among the abstract hops traversed by a path, CSPF module 48 needs to exclude: Links (when abstract hop is constituted by pure link attributes) OR Nodes (when abstract hop has any node attributes), and having memberships of abstract hops that were already encountered in the constraint list before the current one and the abstract hops that are occurring after the current one.

For CSPF module 48 to have processed an abstract hop A, CSPF module 48 must identify a real node with membership in the given abstract hop A, without excluding links/nodes having membership in A to reach it, such that the real node chosen is a feasible starting point for processing the next hop in the constraint list. An abstract hop will typically have more than one router as a member (constituent). Before the actual CSPF, when abstract hops are involved in the path constraint CSPF module 48 identifies the viable set of routers associated with each pass.

From among the viable routers, CSPF module 48 attempts to pick the nearest viable router (from the start of the current pass), for each hop-specification in the path constraint. Exiting each pass via the nearest viable router may not guarantee that the overall path to destination is shortest. Hence, picking the nearest viable router and choosing the shortest overall path to the destination become two different goals. In some examples, CSPF module 48 may be configured such that CSPF module 48 has a goal of exiting each pass via the nearest viable router, and not necessarily finding the shortest overall path to the destination. In other examples, CSPF module 48 may be configured to find the shortest overall path to the destination, as described separately below.

Having picked a viable router that satisfies the abstract hop constraint, the viable router that satisfies the abstract hop constraint becomes the destination of the current pass and also serves as the starting point for the next CSPF pass by CSPF module 48. When choice of current starting point does not result in successful path computation to the destination, CSPF module 48 explores other viable routers (such alternatives may be tried in sorted order of their distance from the given start point, exit point of previous CSPF pass). CSPF module 48 explores alternate viable routers for abstract hops, starting with the last abstract hop in the constraint specification, on failure of the path computation using an initial starting point.

An abstract hop can be of type strict or loose in the path constraint. When an abstract hop A is of type "strict," CSPF module 48 is to process the abstract hop as follows: After the last processed hop in the constraint list, the path should traverse only links/nodes having membership of A, before reaching a node with A's membership that is a feasible starting point for processing the next abstract hop.

When an abstract hop A is of type "loose," CSPF module 48 is to process the abstract hop as follows: After the last processed hop in the constraint list, the path can traverse any real nodes that do not have abstract hop membership of A, before reaching a node with abstract hop membership A, that is a feasible starting point for processing the next abstract hop.

In some examples, the ability to order among links of abstract hop membership may be an option. In both strict and loose case, the computation does not allow (in other words excludes) the abstract hops that precede or succeed A in the constraint list, as the order needs to be preserved. We refer to these exclude/include conditions that involve user defined abstract hops as "derived affinity" to differentiate it from any configured affinity associated with reaching the destination. The path to loose abstract hop A allows for links/nodes with abstract hop A membership and any that are not part of the constraint list. Ordering among links of abstract hop membership may be offered on a configurable basis, such as in response to a selection of this feature by admin 22 via user interface module 44.

In other examples, there may be ordering among links of abstract hop membership. In both strict and loose case, the computation allows the abstract hops that precede or succeed A in the constraint list, as the order among links need not be preserved. So the derived affinity in this case is only to ensure link abstract hop membership in the case of strict abstract hops. In the case of loose abstract hops this is null. In some examples, network device 75 is configured with no ordering among links of abstract hop membership as the default behavior.

For both variants (ordering among links of abstract hop membership and no ordering among links of abstract hop membership), the computation by CSPF module 48 should also take care of excluding from the viable router set of a given pass, the real hops that are part of the constraint list further down in the list or the real hops that were encountered prior to the pass. Abstract hops, as described herein, provide a way to indicate a group of qualifying real nodes in the constraint list as opposed to just one real node. Any per hop attribute that intends to specify the kind of links to be traversed, can be expressed in addition using affinity. The path level affinity continues to be supported.

Affinity can be defined using existing "include all", "include any" or "exclude" constructs, including those that are used for specifying admin group for the overall path today. Admin 22 can define an identifier that is associated with affinity definition and enables the affinity to be referred to in the path constraint, along with real or abstract hops. When, for example, admin 22 specifies an affinity for a real or abstract hop, it means that link with that affinity must be traversed to reach the given hop from the previous hop. The configured affinity associated with a hop applies from the point in computation where the previous hop is considered processed. It should be used along with any derived affinity that is applicable for the hop. Any admin group constraints configured at path level can be overridden using per hop constraint. CSPF module 48 may also support configuring per hop affinity.

Various example combinations of viable router set and affinity are now described. In one example, admin 22 may define a path that includes a strict abstract hop followed by a strict real or abstract hop. When a strict abstract hop A is followed by a strict real hop Ip1, CSPF module 48 reduces the computation to computing a CSPF path to the strict real hop Ip1, using derived affinity that preserves order. If Ip1 does not have abstract hop A membership, the LSP cannot be brought up.

If Ip1 has no affinity configured, the viable router set in this case just consists of Ip1. Hop processed at the end of the pass is up to Ip1. Derived affinity: Include Abstract hop A. If Ip1 has its own affinity configured, the viable router set in this case consists of routers with membership A except all real hops in the path constraint list. Hop processed at the end of the pass is A. Derived affinity: Include Abstract hop A.

When a path is defined in which strict abstract hop A is followed by another strict abstract hop B, CSPF module 48 reduces the computation to computing a CSPF path to any of the routers that have both membership of A and that of B, using affinity that preserves order. So the viable router set consists of routers with membership A and B, except all real hops in the path constraint list. Hop processed at the end of the pass is abstract hop A. Derived affinity: Include Abstract hop A.

Summary: When a strict abstract hop A is followed by anything strict, the abstract hop A applies as affinity until the subsequent strict real hop or a router with subsequent strict hop membership is reached, apart from any excludes that are applied to preserve order.

In the example of a path specified as having a strict abstract hop followed by loose real or abstract hop: When a strict abstract hop A is followed by loose hop Ip1, the computation is to find a CSPF path to any real node with membership A, using affinity that preserves order. Viable router set consists of all routers with membership A except all real hops in the path constraint list. Hop processed at the end of the pass is abstract hop A. Derived affinity: Include Abstract hop A. In some examples, CSPF module 48 is configured to handle the case where loose real hop Ip1 has no configured affinity. If Ip1 has no affinity associated, viable router set consists of all routers with membership A, excluding all real hops in the path constraint list but including Ip1. Hop processed at the end of the pass is abstract hop A if nearest viable router is not Ip1. Otherwise it is Ip1. Derived affinity: Include Abstract hop A.

When a strict abstract hop A is followed by loose abstract hop B, the computation is to find a CSPF path to any real node with membership A, using affinity that preserves order. Viable router set consists of all routers with membership A, except all real hops in the path constraint list. Hop processed at the end of the pass is abstract hop A. Derived affinity: Include Abstract hop A.

Summary: When a strict abstract hop A is followed by anything loose, the abstract hop A applies as affinity to the nearest viable router with abstract hop membership A. And the viable router thus picked will serve as starting point for CSPF to the following loose hop.

In the example of a path specified as having a loose abstract hop followed by loose real or abstract hop: When a loose abstract hop A is followed by loose hop Ip1, CSPF module 48 computes to find a CSPF path to any real node with membership A, using an affinity that preserves overall order. Viable router set consists of all routers with membership A except all real hops in the path constraint list. Hop processed at the end of the pass is abstract hop A. Derived affinity: Null.

In some examples, CSPF module 48 is configured to handle the case where loose real hop Ip1 has no configured affinity. If Ip1 has no affinity associated, viable router set consists of all routers with membership A, excluding all real hops in the path constraint list but including Ip1. Hop processed at the end of the pass is abstract hop A if nearest viable router is not Ip1. Otherwise it is Ip1. Derived affinity: Null.

When a loose abstract hop A is followed by loose abstract hop B, CSPF module 48 computes to find a CSPF path to any real node with membership A, using affinity that preserves order. Viable router set consists of all routers with membership A, except all real hops in the path constraint list. Hop processed at the end of the pass is abstract hop A. Derived affinity: Null.

Summary: When a loose abstract hop A is followed by anything loose, the nearest viable router with membership A is reached with an affinity that preserves overall order. And the viable router thus picked will serve as starting point for CSPF to the following loose hop.

In the example of a path specified as having a loose abstract hop followed by strict real or abstract hop: When a loose abstract hop A is followed by strict hop Ip1, the computation reduces to finding a CSPF path to Ip1, using an affinity that preserves overall order. If Ip1 does not have abstract hop A membership, LSP cannot be brought up. So the viable router set in this case just consists of Ip1 if it has no configured affinity which is the case in this phase. Hop processed at the end of the pass is up to Ip1. Derived affinity: Null. If Ip1 has its own affinity configured in future, the viable router set in this case consists of routers with membership A except all real hops in the path constraint list. Hop processed at the end of the pass is A. Derived affinity: Null.

When a loose abstract hop A is followed by strict abstract hop B, CSPF module 48 computes to find a CSPF path to any real node with membership A and B, using an affinity that preserves overall abstract hop order. On reaching such a real node, abstract hop A is reached. This should be followed by computation as in the above example of strict abstract hop followed by strict real or abstract hop. So viable router set is all routers that have membership of both A and B, except all real hops in the path constraint list. Hop processed at the end of the pass is abstract hop A. Derived affinity: Null.

Summary: When a loose abstract hop A is followed by anything strict, the next viable router is the given real strict hop or a router with both memberships A and B. In other words, when a loose hop is followed by anything strict the set of viable routers can be narrowed down to some extent.

Overall, in accordance with the techniques of this disclosure CSPF module 48 is configured such that whenever an abstract hop is evaluated for coming up with the set of viable router, CSPF module 48 checks the next item in the constraint list. If it is a strict real or abstract hop, this helps narrow down the set of viable routers for the current pass involving abstract hop.

Strict or loose real hop Ip1. When a real hop constraint is to be evaluated for a path which has abstract hops in its constraint list. Viable router set is Ip1. Hop processed at the end of the pass is Ip1. Derived affinity for the pass: Null.

After translating the abstract hops to viable router sets associated with various cspf passes, CSPF module 48 can compute the path in 2 ways: 1. Shortest path per pass method: From among the viable routers, the aim would be to pick the nearest one (from the start of the current pass), for each hop-specification in the path constraint. Having picked a viable router that satisfies the abstract hop constraint, CSPF module 48 uses this viable router as the destination of the current pass and the viable router also serves as the starting point for the next CSPF pass. When choice of current starting point does not result in successful path computation to the destination, CSPF module 48 explores other viable routers. (For example, CSPF module 48 tries such alternatives in sorted order of their distance from the given start point, exit point of previous CSPF pass). CSPF module 48 explores alternate viable routers for abstract hops, starting with the last abstract hop in the constraint specification, on failure of a particular CSPF pass to reach any next viable router based on the abstract hop.

2. Overall shortest path method. Ability to come up with overall shortest path for LSPs with abstract hops. For finding the overall shortest path, CSPF module 48 does CSPF with each viable router as root including ingress. Let's say there are n passes and m viable routers in each pass. Let R(i,j) represent the jth viable router in the ith pass, where i=1 to n and j=1 to m. When CSPF is done with R(i,j) as root, CSPF module 48 will be using the derived affinity associated with ith pass and CSPF module 48 will be noting the constrained shortest path result to all viable routers of next pass i+1. This result will include the cost and ERO from R(i,j) to all viable routers in next pass (R(i+1,1) to R(i+1,m)) The same router can be participating in multiple passes and whenever a viable router is picked as root CSPF module 48 will be noting the shortest path to all viable routers in next pass i+1 except itself, should it also belong to the next pass.

With the above CSPF result collected CSPF module 48 can come up with a graph where each node represents a viable router per pass—R(I,j). Since same router can be part of different passes, there could be more than one node in this graph that actually maps to same real node. Each such node in the graph will have a unidirectional link to every viable router in the next pass i.e., R(i+1,1), R(i+1,2), R(i+1,j) . . . R(i+1,m). The cost and ERO from CSPF result will form the link attributes of this overlay graph. This cost obtained from the earlier CSPF will serve as link cost for the CSPF we will be performing on this graph.

On this graph, with ingress as root, we can perform CSPF avoiding R(I,j) whenever the real node it represents is already in the shortest path taken so far.

The shortest path thus figured, can be expanded by CSPF module 48 using the EROs attached to links, to give the end to end ERO and will be the overall shortest path.

So this requires n*m CSPF computation and in each CSPF computation associated with ith pass (i.e., has a viable router from ith pass as root) CSPF module 48 need to find the shortest path to all viable routers of the (i+1)th pass.

Example configuration details are described below for defining abstract hops, and defining path constraints that use abstract hops. This example configuration may be used by administrator 22 in using UI module 44 (e.g., a command line interface), for example. Example configuration for defining an abstract hop:

Hierarchy
[edit protocols mpls]
[edit logical systems <name> protocols mpls]

In this example, an abstract hop is a list of type ORlist or ANDlist. An abstract hop is identified by a user-defined name and identifier ("id"). In this example, each abstract hop can have up to 32 elements in its ANDlist or ORlist. This limit of 32 can be extended if need arises.

Each list element by itself is a constituent list of type any or all. Constituent list is identified by a name and can contain attributes of type SRLG or admin group or EAG. In some examples, the constituent elements in the list can go up to 16 in number, although other limits or no limit may be used in other examples.

Constituent lists are defined under protocols MPLS and are referred inside abstract hops as lists of type "any" or "all."

```
protocols mpls
{
  + constituent-list <name> {
    + admin-group <name1>
    + admin-group <name2>
    + admin-group <namei>
    + extended-admin-group <name1>
    + extended-admin-group <name2>
    + extended-admin-group <namei>
    + srlg <namei + 1>
    + srlg <namei + 2>
    + srlg <name16>
    <max elements is 16>
  + }
```

If an SRLG is learned from the network alone and not locally configured, it can be referred to as "Unknown_<srlg_id>"

```
+ abstract-hop <abstract-hop-name>
+{
  + Operator [OR|AND]
  + constituent-list <constituent-list-name1>any
  + constituent-list <constituent-list-name2>all
  + constituent-list <constituent-list-namei>any
  + constituent-list <constituent-list-namej>exclude
  + constituent-list <constituent-list-name32>any
  <max no of lists is 32>
+ }
}
```

In some examples, UI module 44 supports a syntax that allows administrator 22 to specify the affinity associated with links in each group, identified by an abstract hop. Affinity is any per hop attribute allowed by RSVP, such as administrative groups and extended administrative groups, for example. UI module 44 may support a syntax to enable an administrator 22 to specify affinity for each hop, be it a real hop or abstract hop.

Example configuration for defining affinity is as follows:

```
Hierarchy
[edit protocols mpls]
[edit logical systems <name> protocols mpls]
protocols mpls {
+ affinity <name>
+{
  + include-any   [ group names ]
  + include-all   [ group names ]
  + exclude       [ group names ]
+}
}
```

Affinity can contain all kind of admin group combinations that are allowed as LSP constraint.

Example configuration for using abstract hop in path constraint is as follows: Under path constraint definition one can use abstract hops and real hops as follows:

```
Hierarchy
[edit protocols mpls]
[edit logical systems <name> protocols mpls]
Protocols mpls
path <path-name>
{
  + <ip-address1> [strict/loose]
  + <abstract-hop-name> [strict/loose]
    <ip-address2> [strict/loose]
  + <abstract-hop-name> [strict/loose]
    <ip-addressn> [strict/loose]
  + <abstract-hop-namen>[strict/loose]
}
```

In some examples, an abstract hop will not be allowed to appear more than once in a path.

Example configuration for using abstract hop and affinity in path constraint is as follows:

```
Hierarchy
[edit protocols mpls]
[edit logical systems <name> protocols mpls]
Protocols mpls
path <path-name>
{
    + <ip-address1> [strict/loose] affinity <affinity name>
    + <abstract-hop-name> abstract [strict/loose] affinity <affinity name>
        <ip-address2> [strict/loose]
    + <abstract-hop-name> abstract [strict/loose] affinity <affinity name>
        <ip-addressn> [strict/loose]
    + <abstract-hop-namen> abstract [strict/loose]
}
```

UI module 44 may also support commands for supportability, including serviceability, diagnose-ability and fault handling. Example commands for serviceability and diagnose-ability include Show commands, commands for showing abstract hop membership, commands for showing per path cspf-computation passes, with list of possible exit routers for each pass, Trace flags for Abstract hop mapping in TED per abstract hop definition (ted-abstract-hop), CSPF for paths involving abstract hop constraints (cspf-abstract-hop), in addition to existing flags.

In some examples, network device 75 may be configured with CLI Commands, such as show commands that are extended to show the abstract hop as link or node attribute. A keyword "local" may be added to indicate that the output would include any local instrumentation. An example command is "Show ted database extensive local." Sample output will be as below:

```
NodeID: 10.255.255.11
    Type: Rtr, Age: 191004 secs, LinkIn: 2, LinkOut: 2
    Abstract hop: hop1
    Protocol: OSPF(0.0.0.0)
        To: 1.4.0.2-1, Local: 1.4.0.1, Remote: 0.0.0.0
            Local interface index: 0, Remote interface index: 0
            Color: 0 <none>
            Metric: 10
            Abstract hop: hop1
            Static BW: 800Mbps
            Reservable BW: 800Mbps
            Available BW [priority] bps:
                [0] 800Mbps  [1] 800Mbps  [2] 800Mbps  [3] 800Mbps
                [4] 800Mbps  [5] 800Mbps  [6] 800Mbps  [7] 800Mbps
            Interface Switching Capability Descriptor(1):
                Switching type: Packet
                Encoding type: Packet
                Maximum LSP BW [priority] bps:
                    [0] 800Mbps  [1] 800Mbps  [2] 800Mbps  [3] 800Mbps
                    [4] 800Mbps  [5] 800Mbps  [6] 800Mbps  [7] 800Mbps
        To: 1.1.0.2-1, Local: 1.1.0.2, Remote: 0.0.0.0
            Local interface index: 0, Remote interface index: 0
            Color: 0 <none>
            Metric: 10
            Abstract hop: hop1
            Static BW: 800Mbps
            Reservable BW: 800Mbps
            Available BW [priority] bps:
                [0] 800Mbps  [1] 800Mbps  [2] 800Mbps  [3] 800Mbps
                [4] 800Mbps  [5] 800Mbps  [6] 800Mbps  [7] 800Mbps
            Interface Switching Capability Descriptor(1):
                Switching type: Packet
                Encoding type: Packet
                Maximum LSP BW [priority] bps:
                    [0] 800Mbps  [1] 800Mbps  [2] 800Mbps  [3] 800Mbps
[4] 800Mbps      [5] 800Mbps  [6] 800Mbps    [7] 800Mbps
```

Another example command is: Show mpls abstract hop membership . This command would provide the abstract hop to TED node mapping:

```
Abstract hop: hop1
ID              Type Age(s) LnkIn LnkOut Protocol
10.255.255.11   Rtr 193387    2     2 OSPF(0.0.0.0)
    To: 1.4.0.2-1, Local: 1.4.0.1, Remote: 0.0.0.0
        Local interface index: 0, Remote interface index: 0
    To: 1.1.0.2-1, Local: 1.1.0.2, Remote: 0.0.0.0
        Local interface index: 0, Remote interface index: 0
ID              Type Age(s) LnkIn LnkOut Protocol
10.255.255.12   Rtr 193382    2     2 OSPF(0.0.0.0)
    To: 1.5.0.2-1, Local: 1.5.0.1, Remote: 0.0.0.0
        Local interface index: 0, Remote interface index: 0
    To: 1.2.0.2-1, Local: 1.2.0.2, Remote: 0.0.0.0
        Local interface index: 0, Remote interface index: 0
Abstract hop: hop2
ID              Type Age(s) LnkIn LnkOut Protocol
10.255.255.13   Rtr 194662    3     3 OSPF(0.0.0.0)
    To: 1.4.0.2-1, Local: 1.4.0.2, Remote: 0.0.0.0
        Local interface index: 0, Remote interface index: 0
    To: 1.6.0.2-1, Local: 1.6.0.1, Remote: 0.0.0.0
Local interface index: 0, Remote interface index: 0
    To: 1.5.0.2-1, Local: 1.5.0.2, Remote: 0.0.0.0
        Local interface index: 0, Remote interface index: 0
ID              Type Age(s) LnkIn LnkOut Protocol
10.255.255.14   Rtr 194660    2     2 OSPF(0.0.0.0)
    To: 1.6.0.2-1, Local: 1.6.0.2, Remote: 0.0.0.0
        Local interface index: 0, Remote interface index: 0
    To: 1.3.0.2-1, Local: 1.3.0.2, Remote: 0.0.0.0
        Local interface index: 0, Remote interface index: 0
```

Show mpls lsp abstract-hop-computation name <lsp-name>

This command would provide the various CSPF passes involved per LSP and the qualifying exit routers for each pass. This also gives the affinity per pass. This includes any derived ones for imposing order among the abstract hops. This also shows the current start router chosen for the pass. The command may allow for debugging.

```
Pass 1 :
Affinity: Abstract hop 1 (derived)
Destinations:
ID              Type Age(s) LnkIn LnkOut Protocol
10.255.255.11   Rtr 193387    2     2 OSPF(0.0.0.0)
    To: 1.4.0.2-1, Local: 1.4.0.1, Remote: 0.0.0.0
        Local interface index: 0, Remote interface index: 0
    To: 1.1.0.2-1, Local: 1.1.0.2, Remote: 0.0.0.0
        Local interface index: 0, Remote interface index: 0
ID              Type Age(s) LnkIn LnkOut Protocol
10.255.255.12   Rtr 193382    2     2 OSPF(0.0.0.0)
    To: 1.5.0.2-1, Local: 1.5.0.1, Remote: 0.0.0.0
        Local interface index: 0, Remote interface index: 0
    To: 1.2.0.2-1, Local: 1.2.0.2, Remote: 0.0.0.0
        Local interface index: 0, Remote interface index: 0
Current start: 10.255.255.10
Pass 2 :
Affinity: Abstract hop 2(derived)
Destinations:
ID              Type Age(s) LnkIn LnkOut Protocol
10.255.255.13   Rtr 194662    3     3 OSPF(0.0.0.0)
    To: 1.4.0.2-1, Local: 1.4.0.2, Remote: 0.0.0.0
        Local interface index: 0, Remote interface index: 0
    To: 1.6.0.2-1, Local: 1.6.0.1, Remote: 0.0.0.0
        Local interface index: 0, Remote interface index: 0
    To: 1.5.0.2-1, Local: 1.5.0.2, Remote: 0.0.0.0
        Local interface index: 0, Remote interface index: 0
ID              Type Age(s) LnkIn LnkOut Protocol
10.255.255.14   Rtr 194660    2     2 OSPF(0.0.0.0)
```

-continued

```
    To: 1.6.0.2-1, Local: 1.6.0.2, Remote: 0.0.0.0
        Local interface index: 0, Remote interface index: 0
    To: 1.3.0.2-1, Local: 1.3.0.2, Remote: 0.0.0.0
        Local interface index: 0, Remote interface index: 0
Current start: 10.255.255.11
Pass 3
Affinity: Exclude Abstract hop 1 and 2 (derived).
Destinations:
ID                Type Age(s) LnkIn LnkOut Protocol
10.255.162.238    Rtr 3293       3     3   OSPF(0.0.0.0)
    To: 1.1.0.2-1, Local: 1.1.0.1, Remote: 0.0.0.0
        Local interface index: 0, Remote interface index: 0
    To: 1.3.0.2-1, Local: 1.3.0.1, Remote: 0.0.0.0
        Local interface index: 0, Remote interface index: 0
    To: 1.2.0.2-1, Local: 1.2.0.1, Remote: 0.0.0.0
        Local interface index: 0, Remote interface index: 0
Current start: 10.255.255.14
```

Figure 3:
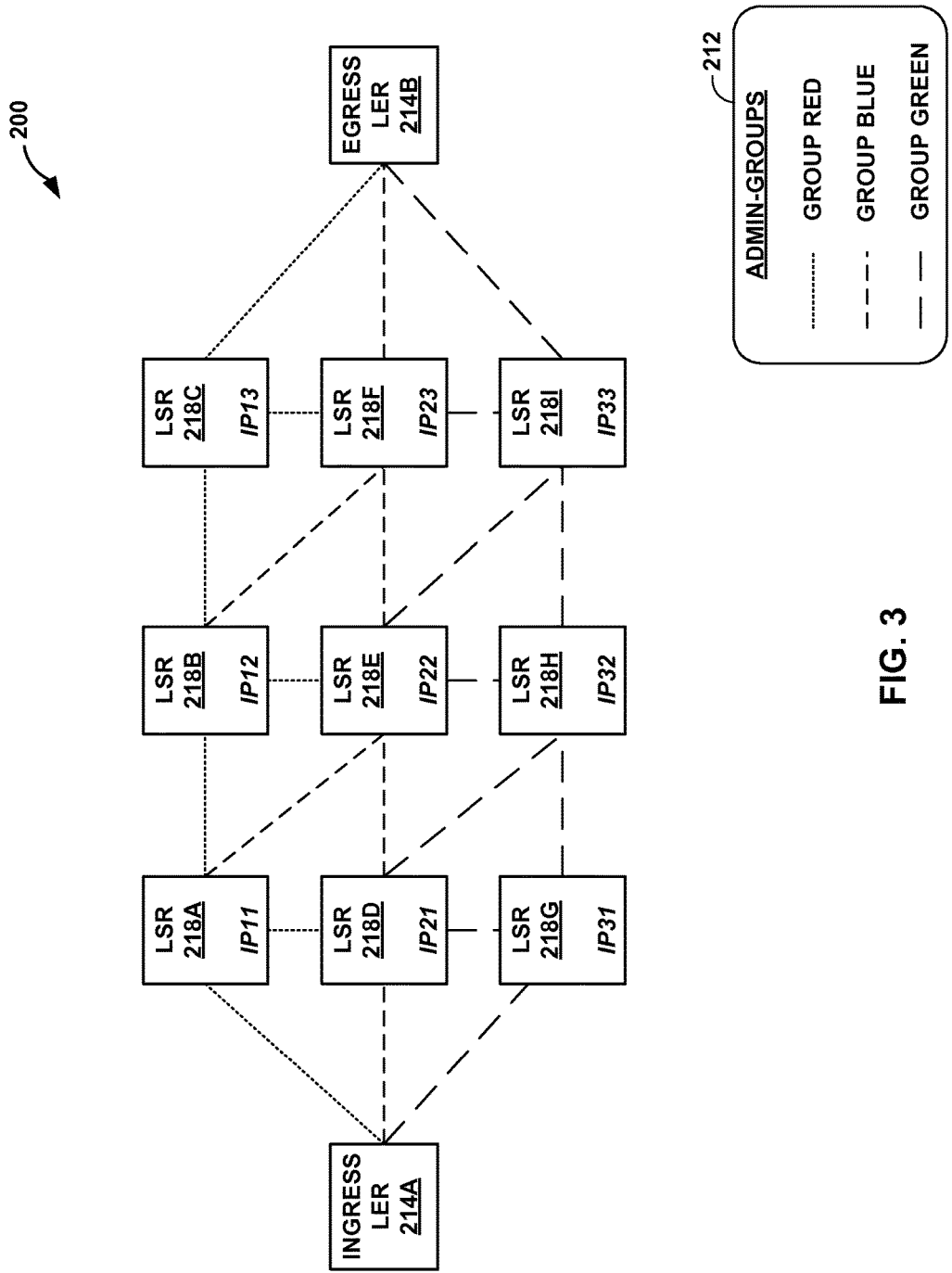
FIG. 3 is a block diagram illustrating an example network system that implements the techniques described in this disclosure.

FIG. 3 is a block diagram illustrating an example network system 200 that implements the techniques described in this disclosure. Network system 200 represents an example network topology that includes an ingress LER 214A and an egress LER 214B ("LERs 214"), where ingress LER 214A and egress LER 214B are communicatively coupled via at least LSRs 218A-218I ("LSRs 218").

As shown in legend 212 of FIG. 3, in this example the links coupling respective pairs of LERs 214, LSRs 218 are mapped to administrative groups ("admin-groups") referred to as red, blue, or green. TABLE 1 shows mappings of links to the admin-groups red, blue and green. Routers in the topology of FIG. 3 are referred to as IP[x] below and in TABLE 1, where x is the IP address of the respective router in the topology of FIG. 3.

TABLE 1

| Red | Blue | Green |
| --- | --- | --- |
| Ingress-IP11 | Ingress-IP21 | Ingress-IP31 |
| IP11-IP21 | IP11-IP22 | IP21-IP31 |
| IP11-IP12 | IP12-IP23 | IP21-IP32 |
| IP12-IP13 | IP21-IP22 | IP31-IP32 |
| IP12-IP22 | IP22-IP23 | IP22-IP32 |
| IP13-IP23 | IP23-Egress | IP32-IP33 |
| IP13-Egress | | IP22-IP33 |
| | | IP23-IP33 |
| | | IP33-Egress |

The following is an example for configuring an ingress router, such as ingress LER 214A of FIG. 3, for using abstract hops in the path constraint, in accordance with the techniques of this disclosure. The following is a simple example where all abstract hops have one constituent and the abstract hops are all strict in the path constraint. In this example, an administrator can configure ingress LER 214A with the abstract hops via UI module 44 using the following syntax:

```
constituent-list list1 {
    Admin-group red
}
constituent-list list2 {
    Admin-group blue
}
constituent-list list3 {
    Admin-group green
}
```

```
Abstract-hop hop1 {
    Id 1
    type ORlist
    constituent-list list1 any;
}
Abstract-hop hop2 {
    Id 2
    type ORlist
    constituent-list list2 any;
}
Abstract-hop hop3 {
    Id 3
    type ORlist
    constituent-list list3 any;
}
```

The abstract hop memberships of the LERs 214, LSRs 218 are shown in TABLE 2 for the above abstract hop definitions. For example, routing component 32 (e.g., RSVP-TE module 45) of network device 75 (FIG. 2) can perform pre-processing of the abstract hop definitions received via UI module 44 or controller interface 74 to obtain abstract hop membership lists ("constituent lists"), which list real hops that qualify as members of the defined abstract hops, as determined by routing component 32. RSVP-TE module 45 can store the constituent lists to abstract hop constituent lists 70.

TABLE 2

| Abstract hop "hop1" | Abstract hop "hop2" | Abstract hop "hop3" |
| --- | --- | --- |
| IP11 | IP11 | IP21 |
| IP12 | IP12 | IP22 |
| IP13 | IP21 | IP23 |
| IP21 | IP22 | IP31 |
| IP22 | IP23 | IP32 |
| IP23 | Egress | IP33 |
| Egress | | Egress |

Network device 75 may receive a request (e.g., from controller 24 or admin 22) to establish an LSP that extends from an ingress network device to an egress network device, wherein the request specifies, as a path constraint for the LSP, a plurality of hops in a defined order, wherein the plurality of hops includes one or more of the abstract hops. In one example, assume there is a path with abstract hops in constraint as follows:

```
Path path1 {
    hop1 abstract strict
    hop2 abstract strict
    hop3 abstract strict
}
```

Routing component 32 (e.g., CSPF module 48 of RSVP-TE module 45) may compute a path for the LSP based on the defined order of the request. In this example, path computation for this path will involve four passes with the egress being a loose hop and the destination of the last pass. The set of routers that are possible results in each of the four passes are illustrated in TABLE 3.

TABLE 3

| Destination: Routers with membership of 1 and 2 Affinity derived: Include abstract hop1 Result: abstract hop 1 reached | Destination: Routers with membership of 2 and 3 Affinity derived: Include abstract hop2. Result: abstract hop 2 reached | Destination: Router with membership 3 Affinity derived: Include abstract hop3. Result: abstract hop 3 reached | Destination: Egress Affinity: null Result: Egress reached |
|---|---|---|---|
| IP11 | IP21 | IP21 | Egress |
| IP12 | IP22 | IP22 | |
| IP21 | IP23 | IP23 | |
| IP22 | IP31 | | |
| IP23 | IP32 | | |
| IP13 | IP33 | | |

CSPF module 48 will attempt destinations in the order of their distance from the start node chosen for the pass. Any destinations already traversed are not considered for further passes. Therefore, in this example, some of the paths that satisfy the defined constraints are:
Ingress→IP11→IP22→IP33→Egress,
Ingress→IP11→IP21→IP22→IP33→Egress,
Ingress→IP11→IP12→IP23→IP33→Egress.

As another example, assume network device 75 receives a request (e.g., from controller 24 or admin 22) to establish an LSP along a path with abstract hops in constraints as follows:

```
Path path1 {
  hop1 abstract loose
  hop2 abstract loose
}
```

Routing component 32 (e.g., CSPF module 48 of RSVP-TE module 45) may compute a path for the LSP based on the defined order of the request. In this example, path computation for this path will involve three passes. The set of routers that are possible results in each of the three passes are illustrated in TABLE 4.

TABLE 4

| Destination: Routers with membership of 1 Affinity derived: null Result: abstract hop 1 reached | Destination: Routers with membership 2 Affinity derived: null Result; abstract hop 2 reached | Destination: Egress Affinity: null Result: Egress reached |
|---|---|---|
| IP11 | IP21 | Egress |
| IP12 | IP22 | |
| IP21 | IP23 | |
| IP22 | | |
| IP23 | | |
| Egress | | |

CSPF module 48 will attempt destinations in the order of their distance from the start node chosen for the pass. Any destinations already traversed are not considered for further passes.

Figure 4:
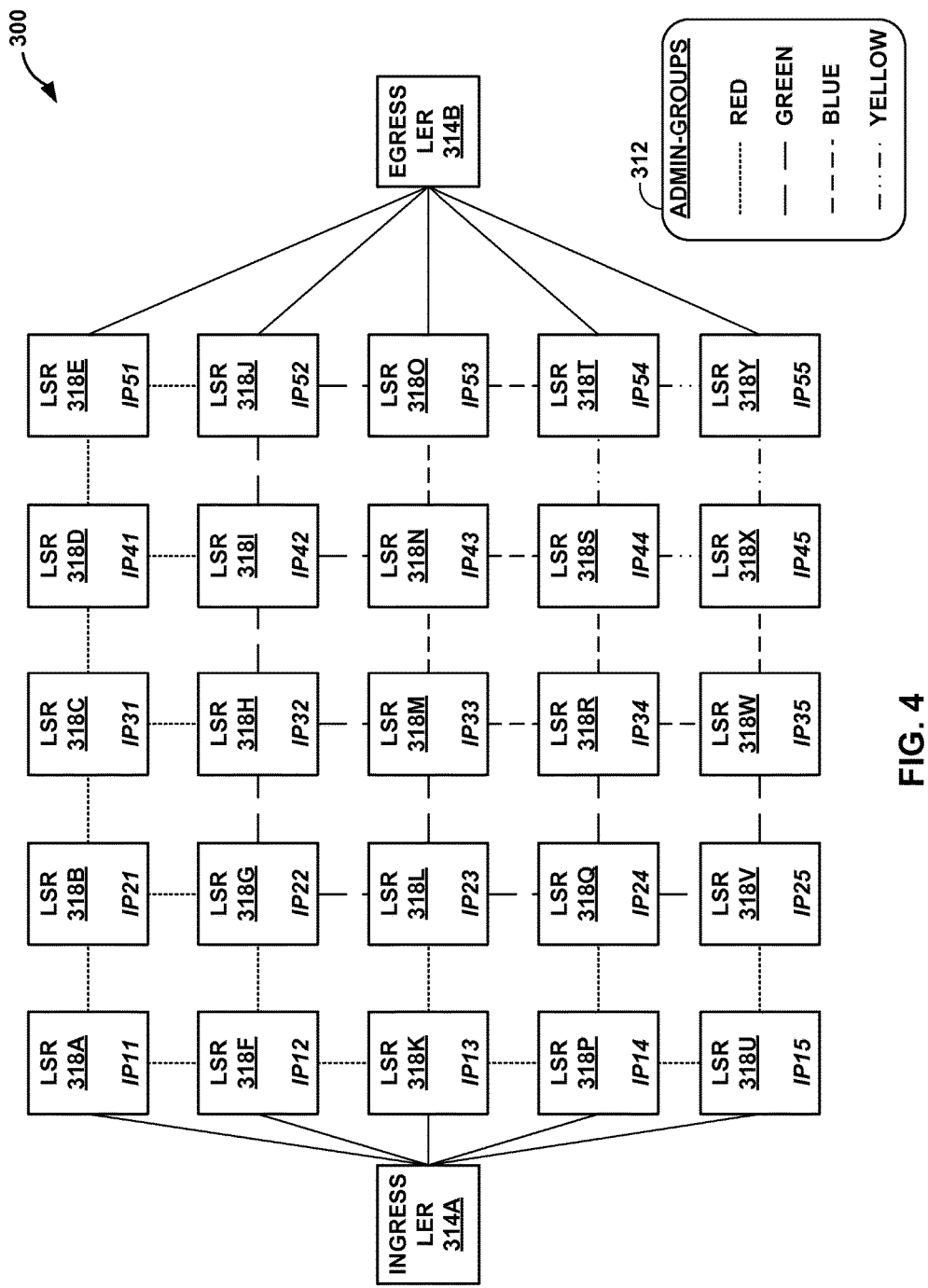
FIG. 4 is a block diagram illustrating an example network system that implements the techniques described in this disclosure

Therefore, in this example, some of the paths that satisfy the defined constraints are:
Ingress→IP31→IP32→IP33→IP23→Egress
Ingress→IP31→IP21→IP22→IP23→Egress
Ingress→IP11→IP22→IP23→Egress FIG. 4 is a block diagram illustrating an example network system 300 that implements the techniques described in this disclosure. Network system 300 represents an example network topology that includes an ingress LER 314A and an egress LER 314B ("LERs 314"), where ingress LER 314A and egress LER 314B are communicatively coupled via at least LSRs 318A-318Y ("LSRs 318").

As shown in legend 312 of FIG. 4, in this example the links coupling respective pairs of LERs 314, LSRs 318 are mapped to administrative groups ("admin-groups") referred to as red, blue, green, or yellow. TABLE 5 shows mappings of links to the admin-groups red, blue green, and yellow. The information depicted in TABLE 5 may be obtained by routing component 32 based on TED 49, for example. Routers in the topology of FIG. 6 are referred as IP[x] below, where x is the router number in the above topology.

TABLE 5

| Red | Green | Blue | Yellow |
|---|---|---|---|
| IP11-IP21 | IP22-IP32 | IP33-IP43 | IP44-IP54 |
| IP21-IP31 | IP32-IP42 | IP43-IP53 | IP45-IP55 |
| IP31-IP41 | IP42-IP52 | IP34-IP44 | IP44-IP45 |
| IP41-IP51 | IP23-IP33 | IP35-IP45 | IP54-IP55 |
| IP12-IP22 | IP24-IP34 | IP43-IP44 | |
| IP13-IP23 | IP25-IP35 | IP53-IP54 | |
| IP14-IP24 | IP32-IP33 | IP33-IP34 | |
| IP15-IP25 | IP42-IP43 | IP34-IP35 | |
| IP11-IP12 | IP52-IP53 | | |
| IP12-IP13 | IP22-IP23 | | |
| IP13-IP14 | IP23-IP24 | | |
| IP14-IP15 | IP24-IP25 | | |
| IP21-IP22 | | | |
| IP31-IP32 | | | |
| IP41-IP42 | | | |
| IP51-IP52 | | | |

Assume that all LSRs 318 in network system 300 of FIG. 4 are connected to adjacent LSRs by vertical and horizontal links, as shown in FIG. 4. Assume that all vertical links belong to SRLG "vertical," and all horizontal links belong to SRLG "horizontal."

As one example, consider an abstract hop "red-or-green-vertical" defined as having red or green vertical links. In this example, an administrator can configure ingress LER 214A with the abstract hop via UI module 44 of LER 214A using the following syntax:

```
Constituent-list red-green {
  Admin group red
  Admin group green
}
Constituent-list vertical {
  SRLG vertical
}
Abstract hop red-or-green-vertical {
  Type ANDList
  Constituent-list red-green any;
  Constituent-list vertical any;
}
```

Routing component 32 can perform pre-processing of the received abstract hop definition to determine those network devices that qualify for membership in the abstract hop "red-or-green-vertical." The links shown as italicized in TABLE 6 are those links in network system 300 that qualify for membership in abstract hop "red-or-green-vertical." The corresponding nodes that the italicized links go from and to will also qualify for membership in abstract hop "red-or-green-vertical" (e.g., LSRs 318H and 318M are "from" and "to" nodes, respectively, for link IP32-IP33).

TABLE 6

| Red | Green | Blue | Yellow |
|---|---|---|---|
| IP11-IP21 | IP22-IP32 | IP33-IP43 | IP44-IP54 |
| IP21-IP31 | IP32-IP42 | IP43-IP53 | IP45-IP55 |
| IP31-IP41 | IP42-IP52 | IP34-IP44 | IP44-IP45 |
| IP41-IP51 | IP23-IP33 | IP35-IP45 | IP54-IP55 |
| IP12-IP22 | IP24-IP34 | IP43-IP44 | |
| IP13-IP23 | IP25-IP35 | IP53-IP54 | |
| IP14-IP24 | IP32-IP33 | IP33-IP34 | |
| IP15-IP25 | IP42-IP43 | IP34-IP35 | |
| IP11-IP12 | IP52-IP53 | | |
| IP12-IP13 | IP22-IP23 | | |
| IP13-IP14 | IP23-IP24 | | |
| IP14-IP15 | IP24-IP25 | | |
| IP21-IP22 | | | |
| IP31-IP32 | | | |
| IP41-IP42 | | | |
| IP51-IP52 | | | |

In another example, consider abstract hop "green-horizontal-or-blue-vertical" defined as having green horizontal links or blue vertical links. Again, assume that all vertical links belong to SRLG "vertical," and all horizontal links belong to SRLG "horizontal." In this example, an administrator can configure ingress LER 314A with the abstract hops via UI module 44 of LER 314A using the following syntax:

```
Constituent-list green-horizontal {
    Admin group green
    SRLG horizontal
}
Constituent-list blue-vertical {
    SRLG vertical
    Admin group blue
}
Abstract hop green-horizontal-or-blue-vertical {
    Type ORList
    Constituent-list green-horizontal all;
    Constituent-list blue-vertical all;
}
```

The links shown as italicized in TABLE 7 are those links in network system 300 that qualify for membership in abstract hop "green-horizontal-or-blue-vertical". Routing component 32 can perform pre-processing of the received abstract hop definition to determine those network devices that qualify for membership in the abstract hop "green-horizontal-or-blue-vertical." The corresponding nodes that the italicized links go from and to will also qualify for membership in abstract hop "green-horizontal-or-blue-vertical."

TABLE 7

| Red | Green | Blue | Yellow |
|---|---|---|---|
| IP11-IP21 | IP22-IP32 | IP33-IP43 | IP44-IP54 |
| IP21-IP31 | IP32-IP42 | IP43-IP53 | IP45-IP55 |
| IP31-IP41 | IP42-IP52 | IP34-IP44 | IP44-IP45 |
| IP41-IP51 | IP23-IP33 | IP35-IP45 | IP54-IP55 |
| IP12-IP22 | IP24-IP34 | IP43-IP44 | |
| IP13-IP23 | IP25-IP35 | IP53-IP54 | |
| IP14-IP24 | IP32-IP33 | IP33-IP34 | |
| IP15-IP25 | IP42-IP43 | IP34-IP35 | |
| IP11-IP12 | IP52-IP53 | | |
| IP12-IP13 | IP22-IP23 | | |
| IP13-IP14 | IP23-IP24 | | |
| IP14-IP15 | IP24-IP25 | | |
| IP21-IP22 | | | |
| IP31-IP32 | | | |
| IP41-IP42 | | | |
| IP51-IP52 | | | |

Figure 5:
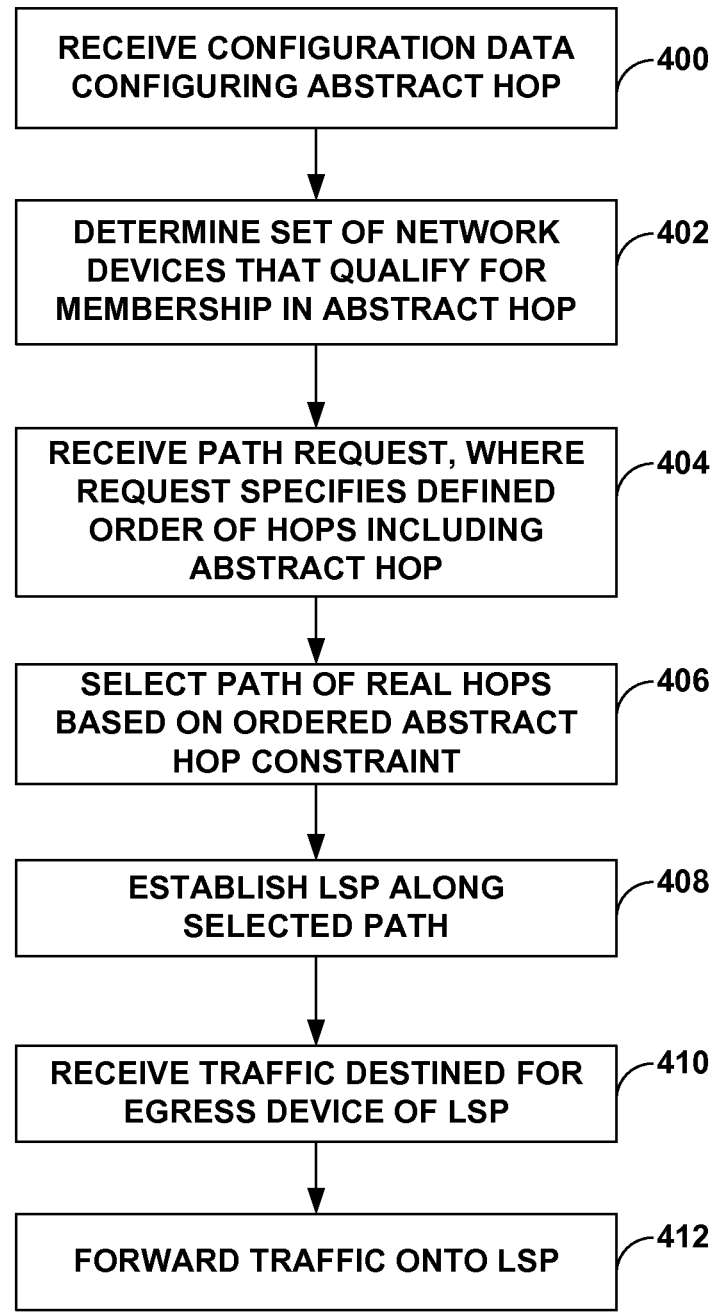
FIG. 5 is a flowchart illustrating example operation of network devices in implementing the ordered abstract hop path constraint techniques described in this disclosure.

FIG. 5 is a flowchart illustrating example operation of one or more network devices, such as network devices of FIGS. 1 and 2, in accordance with techniques of this disclosure. In some examples, some steps shown in FIG. 5 may be performed by controller 24, while other steps may be performed by LER 14A, for example. In some examples, all steps of FIG. 5 may be performed by LER 14A. For purposes of example, FIG. 5 will be described with respect to LER 14A performing the steps.

LER 14A receives configuration information defining one or more abstract hops for which membership is defined as those network devices that satisfy a logical combination of one or more constituent attributes (400). For example, LER 14A may receive the configuration information via a configuration interface of LER 14A used for locally configuring LER 14A, from one or more of administrator 22 and controller 24 (e.g., via UI module 44 or controller interface 74). In some examples, controller 24 receives this configuration information, e.g., by user configuration. The constituent attributes may be defined in terms of characteristics of links and/or nodes, and may specify exclusions of certain links or nodes. For example, the constituent attributes may be defined based on one or more of administrative groups, extended administrative groups, and Shared Risk Link Groups (SRLGs).

LER 14A (or controller 24) may be configured to determine, in response to receiving the configuration information, for each of the defined abstract hops, a set of network devices in the network that qualify for membership in the abstract hop based on network topology information (402). In some examples, LER 14A may receive the network topology information from controller 24, and/or from IGP update messages received from IGP peer network devices. LER 14A may receive a request (e.g., from controller 24 or admin 22) to compute a path that extends from an ingress network device to an egress network device, wherein the request specifies, as a constraint for the path, a plurality of hops in a defined order, wherein the plurality of hops includes one or more of the abstract hops (i.e., the request specifies an abstract hop constraint) (404). In some examples, controller 24 receives the request from LER 14A to compute a path that includes one or more abstract hops.

In response to receiving the path request, LER 14A (or controller 24) can compute a path from the ingress network device (e.g., itself) to the specified egress network device, e.g., LER 14B, based on the ordered abstract hop constraint (406). That is, for each of the abstract hops, LER 14A can select a real hop from the respective set of network devices that qualify for the abstract hop. The selected real hop may in some cases be the network device, from the among the network devices that qualify for the abstract hop, that is on a shortest path from a previous hop to the abstract hop. In some examples, LER 14A may determine an explicit route object having a plurality of real hops that each respectively correspond to the plurality of hops in the defined order, wherein the plurality of real hops includes the selected real hop. In the example of controller 24 performing steps 400-406, controller 24 may provide to LER 14A an indication of the computed path (e.g., an ERO).

LER 14A establishes an LSP along the computed path according to the defined order. The path includes a plurality of real hops that each respectively correspond to the plurality of hops in the defined order (408). For example, in the case of RSVP-TE, LER 14A can send an RSVP-TE PATH request that includes the explicit route object along the selected path to initiate establishing an RSVP-TE LSP, and in response may receive an RSVP-TE RESV message that confirms establishment of the LSP along the specified path.

After the LSP is established, when LER 14A receives traffic destined for the egress device of the LSP (e.g., LER 14B) (410), LER 14A can forward traffic on the LSP to LER 14B (412). If one of the links or nodes along the path goes down, LER 14A can easily select a different hop along the path that also satisfies the abstract hop membership, and can re-signal the LSP along the new path without needing to indicate an LSP failure or error to the entity requesting the LSP. In this example, the network device that receives the configuration information defining the abstract hops via the local configuration interface of the network device is the same network device that establishes the LSP.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of the techniques have been described. These and other aspects are within the scope of the following claims.

What is claimed is:

1. A method comprising:
   receiving, by a network device in a network via a configuration interface for configuring the network device, configuration information to define one or more abstract hops for which membership is defined as those network devices that satisfy a logical combination of one or more constituent attributes;
   determining, by the network device and based on network topology information, for each abstract hop of the one or more defined abstract hops, a respective set of two or more network devices in the network that qualify for membership in the abstract hop;
   receiving, by the network device, a request to establish a label switched path (LSP) from an ingress network device to an egress network device, wherein the request specifies, as a path constraint for the LSP, a plurality of hops in a defined order, wherein the plurality of hops includes the one or more abstract hops; and
   establishing an LSP along a path that includes a plurality of real hop network devices that each respectively correspond to the plurality of hops in the defined order.

2. The method of claim 1,
   wherein the network device comprises the ingress network device,
   wherein the configuration interface comprises a user interface of the network device, and
   wherein receiving the configuration information via the configuration interface comprises receiving the configuration information from an administrator of the network device via the user interface.

3. The method of claim 2, wherein the user interface comprises a command line interface.

4. The method of claim 1, wherein the network device comprises the ingress network device,
   wherein the configuration interface comprises a controller interface of the network device for receiving configuration by a centralized controller, and
   wherein receiving the configuration information via the configuration interface comprises receiving the configuration information from the centralized controller via the controller interface.

5. The method of claim 1, wherein receiving the configuration information comprises receiving configuration information defining an abstract hop as a logical combination of attributes including a first link or node attribute and excluding a second link or node attribute.

6. The method of claim 1, wherein receiving the configuration information comprises receiving configuration information defining an abstract hop as a list of constituent attributes.

7. The method of claim 6, wherein the list of constituent attributes comprises a nested list of one or more lists of constituent attributes.

8. The method of claim 1, wherein receiving the configuration information comprises receiving configuration information defining an abstract hop as a list of constituent attributes in which any one of the constituent attributes should be met to satisfy the overall constituent list criteria.

9. The method of claim 1, wherein receiving the configuration information comprises receiving configuration information defining an abstract hop as a list of constituent attributes in which all of the constituent attributes should be met to satisfy the overall constituent list criteria.

10. The method of claim 1, wherein the one or more constituent attributes comprises one or more attributes selected from the group consisting of: administrative groups, extended administrative groups, and Shared Risk Link Groups (SRLGs).

11. The method of claim 1, wherein the constituent attributes comprise one or more link or node attributes that the network device obtains from Interior Gateway Protocol Traffic Engineering (IGP-TE) update messages received from an IGP peer network device.

12. The method of claim 1, further comprising storing, by the network device, each respective set of two or more network devices in the network that qualify for membership in the abstract hop.

13. The method of claim 12,
wherein the one or more abstract hops comprises at least a first abstract hop and a second abstract hop, the method further comprising:
determining, by the network device, an abstract hop intersection set of one or more network devices in the network that qualify for membership in both the first abstract hop and the second abstract hop; and
storing, by the network device, the abstract hop intersection set.

14. The method of claim 1, further comprising receiving, via the configuration interface, configuration information defining one or more per hop affinities.

15. The method of claim 1, further comprising:
selecting, by the network device and in response to receiving the request, a path from the ingress network device to the egress network device, wherein selecting the path comprises for each of the one or more abstract hops, selecting a real hop network device from the respective set of network devices that qualify for the respective abstract hop, wherein the real hop network device is on a shortest path from a previous hop to the real hop network device;
determining an explicit route object having a plurality of real hop network devices that each respectively correspond to the plurality of hops in the defined order, wherein the plurality of real hop network devices includes the selected real hop network device;
establishing the LSP along the selected path using the explicit route object; and
forwarding traffic on the LSP.

16. The method of claim 1, further comprising:
selecting, by the network device and in response to receiving the request, an overall shortest path from the ingress network device to the egress network device, wherein selecting the overall shortest path comprises for each of the one or more abstract hops, selecting a real hop from the respective set of network devices that qualify for the respective abstract hop, wherein the real hop network device is on a shortest path from a previous hop to the real hop network device.

17. The method of claim 1, wherein receiving the request to establish the LSP comprises receiving a request to establish one of an intra-area LSP and an inter-area LSP.

18. The method of claim 1, wherein the request specifies at least one of the one or more abstract hops as a strict type hop in the path constraint.

19. The method of claim 1, wherein the request specifies at least one of the one or more abstract hops as a loose type hop in the path constraint.

20. The method of claim 1, wherein the request specifies an order among links of specified abstract hop membership.

21. The method of claim 1, wherein the request specifies the plurality of hops as including one or more real hop network devices defined in terms of addresses of respective network devices.

22. The method of claim 1, further comprising: in response to receiving the configuration information, automatically determining, by the network device and based on network topology information and the received configuration information, an abstract hop set of one or more routers that are members of each abstract hop of the one or more abstract hops.

23. The method of claim 1, further comprising:
in response to receiving the configuration information, automatically determining, by the network device and based on network topology information and the received configuration information, an abstract hop intersection set of one or more routers that are members of two abstract hops.

24. A network device comprising:
a memory configured to store instructions;
a configuration interface for configuring the network device; and
one or more processors in communication with the configuration interface and the memory and configured to:
receive, via the configuration interface, configuration information to define one or more abstract hops for which membership is defined as those network devices that satisfy a logical combination of one or more constituent attributes;
determine, for each of the one or more defined abstract hops, a respective set of two or more network devices in a network that qualify for membership in the abstract hop based on network topology information for a network;
receive a request to establish a label switched path (LSP) from an ingress network device to an egress network device of the network, wherein the request specifies, as a path constraint for the LSP, a plurality of hops in a defined order, wherein the plurality of hops includes the one or more abstract hops; and
establish an LSP along a path that includes a plurality of real hop network devices that each respectively correspond to the plurality of hops in the defined order.

25. The network device of claim 24, wherein the network device comprises the ingress network device,
wherein the configuration interface comprises a user interface configured to support a syntax that allows a user to enter the configuration information to define the one or more abstract hops.

26. The network device of claim 24, wherein the user interface comprises a command line interface.

27. The network device of claim 24, wherein the network device comprises the ingress network device, and wherein the configuration interface comprises a controller interface of the network device for receiving configuration by a centralized controller.

28. The network device of claim 24, wherein the configuration information defines an abstract hop as a logical combination of attributes including a first link or node attribute and excluding a second link or node attribute.

29. The network device of claim 24, wherein the configuration information defines an abstract hop as a list of constituent attributes, wherein the list of constituent attributes comprises a nested list of one or more lists of constituent attributes.

30. The network device of claim 24, wherein the one or more abstract hops comprises at least a first abstract hop and a second abstract hop, wherein the one or more processors are configured to:
- store an indication of each respective set of one or more network devices in the network that qualify for membership in the abstract hop,
- determine an abstract hop intersection set of one or more network devices in the network that qualify for membership in both the first abstract hop and the second abstract hop; and
- store the abstract hop intersection set.

31. The network device of claim 24, wherein the one or more processors are configured to:
- select, in response to receiving the request, a path from the ingress network device to the egress network device, wherein selecting the path comprises for each of the one or more abstract hops, selecting a real hop network device from the respective set of network devices that qualify for the respective abstract hop, wherein the real hop network device is on a shortest path from a previous hop to the real hop network device;
- determine an explicit route object having a plurality of real hop network devices that each respectively correspond to the plurality of hop network devices in the defined order, wherein the plurality of real hops includes the selected real hop network device;
- establish the LSP along the selected path using the explicit route object; and
- forward traffic on the LSP.

32. A non-transitory computer-readable device comprising instructions that, when executed, cause one or more processors to:
- receive, via the configuration interface, configuration information to define one or more abstract hops for which membership is defined as those network devices that satisfy a logical combination of one or more constituent attributes;
- determine, for each of the one or more defined abstract hops, a respective set of two or more network devices in a network that qualify for membership in the abstract hop based on network topology information for a network;
- receive a request to establish a label switched path (LSP) from an ingress network device to an egress network device of the network, wherein the request specifies, as a path constraint for the LSP, a plurality of hops in a defined order, wherein the plurality of hops includes the one or more abstract hops; and
- establish an LSP along a path that includes a plurality of real hop network devices that each respectively correspond to the plurality of hops in the defined order.

33. A method comprising:
- receiving, by a network device in a network via a configuration interface for configuring the network device, configuration information to define one or more abstract hops for which membership is defined as those network devices that satisfy a logical combination of one or more constituent attributes;
- determining, by the network device and based on network topology information, for each abstract hop of the one or more defined abstract hops, a respective set of two or more network devices in the network that qualify for membership in the abstract hop;
- receiving, by the network device, a request to compute a path from an ingress network device to an egress network device, wherein the request specifies, as a constraint for the path, a plurality of hops in a defined order, wherein the plurality of hops includes the one or more abstract hops;
- computing the path based on the specified constraint to obtain a computed path; and
- sending an indication of the computed path to a sender of the request.

34. The method of claim 33, wherein the network device comprises a path computation entity (PCE), and wherein the sender of the request comprises a path computation client (PCC) of the ingress network device.

* * * * *